(12) United States Patent
Mehr et al.

(10) Patent No.: US 12,071,383 B2
(45) Date of Patent: Aug. 27, 2024

(54) CONTACT JOULE HEATING FOR SINTERING HIGH TEMPERATURE COATINGS

(71) Applicant: Honeywell International Inc., Charlotte, NC (US)

(72) Inventors: Mehrad Mehr, Raleigh, NC (US); Bahram Jadidian, Watchung, NJ (US)

(73) Assignee: Honeywell International Inc., Charlotte, NC (US)

( * ) Notice: Subject to any disclaimer, the term of this patent is extended or adjusted under 35 U.S.C. 154(b) by 479 days.

(21) Appl. No.: 17/302,009

(22) Filed: Apr. 21, 2021

(65) Prior Publication Data

US 2022/0348513 A1 Nov. 3, 2022

(51) Int. Cl.
| | | |
|---|---|---|
| *C04B 41/87* | (2006.01) | |
| *C04B 40/02* | (2006.01) | |
| *C04B 41/00* | (2006.01) | |
| *C04B 41/50* | (2006.01) | |
| *C04B 41/89* | (2006.01) | |

(52) U.S. Cl.
CPC .......... *C04B 41/87* (2013.01); *C04B 40/0272* (2013.01); *C04B 41/0072* (2013.01); *C04B 41/5024* (2013.01); *C04B 41/5051* (2013.01); *C04B 41/89* (2013.01); *C04B 2235/3427* (2013.01); *C04B 2235/3817* (2013.01); *C04B 2235/6581* (2013.01)

(58) Field of Classification Search
CPC ......... C04B 35/66; C04B 35/16; C04B 35/50; C04B 35/56; C04B 35/58; C04B 35/5805; C04B 35/62; C04B 41/0072; C04B 41/009; C04B 41/87; C04B 41/89; C04B 2111/763; C04B 2235/3427; C04B 2235/3817

USPC ........................................................ 427/591
See application file for complete search history.

(56) References Cited

U.S. PATENT DOCUMENTS

| | | |
|---|---|---|
| 4,837,073 A | 6/1989 | Mcallister et al. |
| 4,928,870 A | 5/1990 | Gat-Liquornik et al. |
| 5,448,041 A | 9/1995 | Benoit et al. |

(Continued)

FOREIGN PATENT DOCUMENTS

| | | |
|---|---|---|
| CN | 102674892 A | 9/2012 |
| CN | 110818426 A | 2/2020 |

(Continued)

OTHER PUBLICATIONS

Serrazina et al., Modeling the particle contact influence on the Joule heating and temperature distribution during FLASH sintering. Journal of the European Ceramic Society, 40 (4), 1205-1211 (2020). (Year: 2020).*

(Continued)

*Primary Examiner* — William P Fletcher, III
(74) *Attorney, Agent, or Firm* — Shumaker & Sieffert, P.A.

(57) ABSTRACT

A method for forming a high temperature coating includes forming a pre-sintered ceramic coating on a ceramic composite substrate. The pre-sintered ceramic coating includes a plurality of ceramic particles. The method further includes sintering at least a portion of the pre-sintered ceramic coating by heating the portion of the pre-sintered ceramic coating to a sintering temperature of the plurality of ceramic particles using joule heating. The sintering temperature is greater than about 1000 degrees Celsius (° C.).

10 Claims, 12 Drawing Sheets

(56) References Cited

U.S. PATENT DOCUMENTS

| | | | |
|---|---|---|---|
| 5,463,367 | A | 10/1995 | Ellis |
| 6,555,173 | B1 | 4/2003 | Forsythe et al. |
| 9,061,947 | B1 | 6/2015 | Ramachandran et al. |
| 9,340,460 | B2 | 5/2016 | Courcot Mendez et al. |
| 9,382,164 | B2 | 7/2016 | Andreani et al. |
| 9,463,489 | B2 | 10/2016 | Allemand et al. |
| 9,758,678 | B2 | 9/2017 | Nicolaus et al. |
| 2003/0143436 | A1 | 7/2003 | Forsythe et al. |
| 2005/0254942 | A1 | 11/2005 | Morrison et al. |
| 2009/0282949 | A1 | 11/2009 | Seals et al. |
| 2014/0134399 | A1 | 5/2014 | Kirby et al. |
| 2016/0017749 | A1 | 1/2016 | Luthra et al. |
| 2016/0160664 | A1 | 6/2016 | Luthra et al. |
| 2019/0072144 | A1 | 3/2019 | Bianco et al. |
| 2019/0375689 | A1* | 12/2019 | Saha .................. F01D 25/005 |
| 2020/0377990 | A1 | 12/2020 | Li et al. |
| 2021/0101842 | A1 | 4/2021 | LeCostaouec et al. |

FOREIGN PATENT DOCUMENTS

| | | | |
|---|---|---|---|
| EP | 1256635 | A1 | 11/2002 |
| EP | 3623356 | A1 | 3/2020 |
| EP | 3922453 | A1 | 12/2021 |
| JP | H01176282 | A | 1/1998 |
| JP | 6358110 | B2 | 7/2018 |
| WO | WO-2020236767 | A1 * | 11/2020 .............. B22F 10/10 |

OTHER PUBLICATIONS

Joule heating, Encyclopedia Britannica, Jun. 29, 2022, https://www.britannica.com/science/Joules-law. Accessed Dec. 19, 2023. (Year: 2022).*

Zhu et al., "Thermal Expansion and Thermal Conductivity of Rare Earth Silicates," National Aeronautics and Space Administration, NASA, The 30th Annual Cocoa Beach International Conference on Advanced Ceramics and Composites, Cocoa Beach, Florida, Jan. 22-27, 2006, 10 pp.

Arthur et al., "Design of Thermally Reliable Environmental Barrier Coating for a SiC/SiC Ceramic Matrix Composites," Scientific & Academic Publishing, International Journal of Composite Materials, vol. 3, Issue 6, (Applicant points out, in accordance with MPEP 609.04(a), that the year of publication, 2013, is sufficiently earlier than the effective U.S. filing date, so that the particular month of publication is not in issue.), pp. 191-197.

Ushakov et al., "Carbides and Nitrides of Zirconium and Hafnium," MDPI, Materials, vol. 12, (Applicant points put, in accordance with MPEP 609.04(a), that the year of publication, 2019, is sufficiently earlier than the effective U.S. filing date, so that the particular month of publication is not in issue.), 23 pp.

Calcagno et al., "Crystallisation mechanism of amorphous silicon carbide", Applied Surface Science, vol. 184, No. 1-4, Elsevier, Dec. 12, 2001, pp. 123-127.

Office Action from U.S. Appl. No. 17/302,011 dated Sep. 7, 2023, 12 pp.

U.S. Appl. No. 17/302,011, filed Apr. 21, 2021, by Mehr et al.

U.S. Appl. No. 17/302,014, filed Apr. 21, 2021, by Mehr et al.

Ebata et al., "Electrical Joining of Silicon Nitride Ceramics", Journal of the Ceramic Society of Japan, International Edition, vol. 97, No. 1, Fuji Technology Press, Jan. 1989, pp. 83-85.

Response to Extended Search Report dated Aug. 26, 2022, from counterpart European Application No. 22166271.1 filed Dec. 5, 2022, 101 pp.

Extended Search Report from counterpart European Application No. 22166271.1, dated Aug. 26, 2022, 8 pp.

Response to Office Action dated Sep. 7, 2023 from U.S. Appl. No. 17/302,011, filed Dec. 1, 2023, 11 pp.

Final Office Action from U.S. Appl. No. 17/302,011 dated Feb. 8, 2024, 14 pp.

Jackson et al., "Industrial Applications of Electric Infrared Heating," Advanced Energy, 1998 (Applicant points out, in accordance with MPEP 609.04(a), that the year of publication, 1998, is sufficiently earlier than the effective U.S. filing date, so that the particular month of publication is not in issue.), 60 pp.

Advisory Action from U.S. Appl. No. 17/302,011 dated Apr. 15, 2024, 3 pp.

Response to Final Office Action dated Feb. 8, 2024 from U.S. Appl. No. 17/302,011, filed Apr. 8, 2024, 9 pp.

Office Action from U.S. Appl. No. 17/302,011 dated Jun. 26, 2024, 10 pp.

* cited by examiner

CONTACT JOULE HEATING FOR SINTERING HIGH TEMPERATURE COATINGS

TECHNICAL FIELD

The disclosure relates to high temperature coatings and interfaces for composites.

BACKGROUND

Carbon-carbon (C—C) composites may be used in high temperature applications. For example, the aerospace industry employs C—C composite components as friction materials for commercial and military aircraft, such as brake friction materials. In high temperature applications, C—C composites may be susceptible to oxidation or delamination, which may lead to deterioration of physio-mechanical properties.

SUMMARY

The disclosure describes high temperature coatings for ceramic composite substrates that protect against oxidation at high temperatures and high temperature interfaces for ceramic composite substrates that bond substrates together, and techniques for making the same using joule heating.

In one example, a method includes forming a pre-sintered ceramic coating on a ceramic composite substrate. The pre-sintered ceramic coating includes a plurality of ceramic particles. The method further includes sintering at least a portion of the pre-sintered ceramic coating by heating the portion of the pre-sintered ceramic coating to a sintering temperature of the plurality of ceramic particles using joule heating. The sintering temperature is greater than about 1000 degrees Celsius (° C.).

In another example, a system for forming a high temperature ceramic coating, includes an enclosed chamber and one or more contact elements. The enclosed chamber is configured to house an article and maintain an inert or vacuum atmosphere in the enclosed chamber. The article includes a pre-sintered ceramic coating on a ceramic composite substrate, and the pre-sintered ceramic coating includes a plurality of ceramic particles. The one or more contact elements are configured to contact a portion of the article and generate joule heat to heat a portion of the pre-sintered ceramic coating to a sintering temperature of the plurality of ceramic particles to sinter the portion of the pre-sintered ceramic coating. The sintering temperature is greater than about 1000° C.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
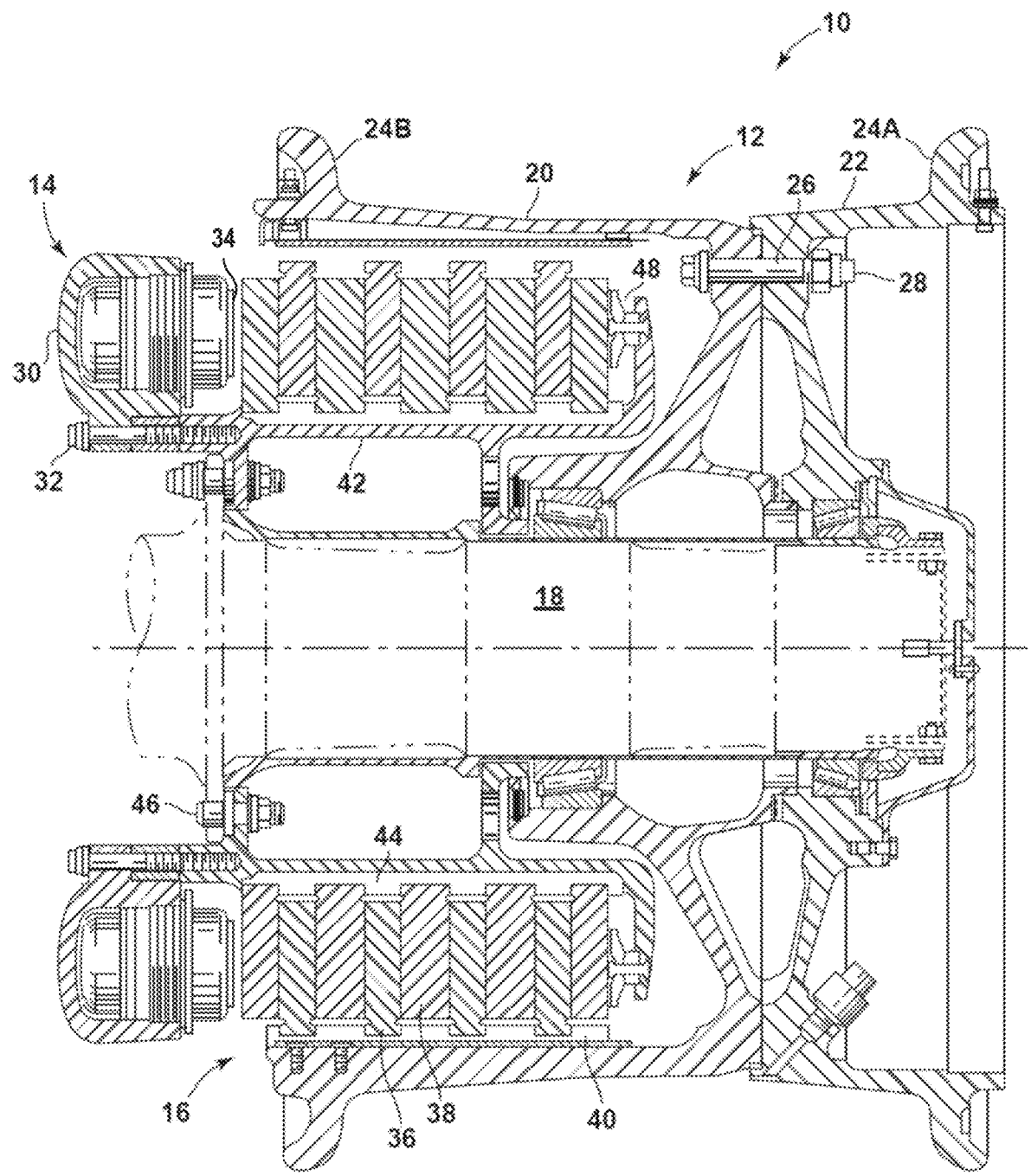
FIG. 1 is a schematic diagram illustrating an example aircraft brake assembly including composite brake disc that include a high temperature coating formed in accordance with the techniques of this disclosure.

The disclosure describes high temperature coatings and joint interfaces for ceramic composite articles for high (e.g., greater than 1000 degrees Celsius (° C.)) and/or ultra-high temperature (e.g., greater than 1500° C.) applications. Ceramic composite components may provide good mechanical properties and have low mass density relative to other materials, such as metal alloys. However, at high temperatures, ceramic composite components may be susceptible to oxidation, environmental attack, and degradation of physio-mechanical properties.

Ceramic-based antioxidant coatings may improve resistance to oxidation and/or environmental attack at high temperatures experienced in aerospace applications, such as aircraft brakes (e.g., temperatures as high as 1600° C. or even higher). To form these antioxidant coatings, ceramic particles may be applied to a surface of a high temperature ceramic-composite-based substrate, such as in a slurry, and sintered at a high temperature to fuse the ceramic particles below a melting point of the ceramic particles. This high temperature heating may heat both the coating and the substrate, and for large components, may require a large furnace.

In some examples, an article includes a ceramic composite substrate and a high temperature coating on the substrate. To form the high temperature coating on the substrate, a mixture that includes ceramic particles may be applied to a surface of the substrate and pre-treated to form a pre-sintered (e.g., "green" or "brown") ceramic coating. To sinter the pre-sintered ceramic coating, the ceramic particles may be heated to a sintering temperature and maintained at the sintering temperature for a period of time until ceramic material of the ceramic particles migrate across particles to fuse the ceramic particles together. The sintering temperature for mobilizing the ceramic material may be relatively high, and the substrate underlying the coating may be damaged if maintained at the sintering temperature for a long period of time. For example, bulk heating of the substrate and ceramic coating to sinter the ceramic coating may expose the substrate to high temperatures for a long period of time while the surrounding atmosphere reaches the sintering temperature. In some instances, a bulk heating furnace may not even be capable of achieving temperatures required to sinter ultra-high temperature ceramic materials or be capable of housing large ceramic composite substrates.

According to various embodiments of the disclosure, high temperature coatings described herein may be sintered using fast, localized joule heating. Joule heating may produce conductive or radiative heat from an electrical current flowing through one or more conductors. Unlike bulk heating, which may convectively heat a coating by maintaining an environment at a bulk temperature, joule heating may be localized to one or more portions of the pre-sintered ceramic coating. This localized heating may quickly sinter the relatively thin ceramic coating, such as within seconds or minutes, such that the underlying substrate may receive a reduced amount of heat compared to bulk heating methods. The localized heat may also be applied discretely and without a large, heated environment, such that large substrates may be coated with the high temperature sintered coatings using a relatively low amount of energy. Additionally, such localized heating may be capable of achieving very high temperatures (e.g., up to 2500° C.) that may not be possible with conventional furnaces.

In some instances, high temperature coatings described herein may be sintered using one or more contact heating elements. A contact heating element may contact a portion of the pre-sintered ceramic coating and generate joule heat in the contact heating element to conductively heat the contacted portion of the pre-sintered ceramic coating. The contact heating element may quickly heat up to the sintering temperature using a relatively small amount of energy. As a result, only a small portion of the underlying substrate near the surface may be heated to the sintering temperature.

In some instances, high temperature coatings described herein may be sintered using one or more contact electrical elements. A contact electrical element may directly or indirectly (e.g., through the coating) contact a portion of the underlying substrate and generate joule heat in the underlying substrate to heat the portion of the pre-sintered ceramic coating. High temperatures in the substrate from the joule heating may be concentrated at near the surface of the substrate. As a result, other portions of the substrate may remain at relatively low temperatures.

In some instances, high temperature coatings described herein may be sintered using one or more non-contact radiative heating elements. A non-contact radiative heating element may be positioned near a portion of the ceramic coating and generate joule heat to heat the adjacent coating using radiation. A hot zone created by the non-contact radiative heating element may be relatively constrained by distance to a volume near the non-contact radiative heating element. The non-contact radiative heating element may include radiative surfaces that may not rely on a specific contour matching a contour of the radiative surfaces, such that non-planar or hard-to-reach coating surfaces may be effectively sintered.

In some instances, high temperature coatings described herein may be sintered while being compressed using one or more contact heating elements. A contact heating element may both heat the pre-sintered ceramic coating and apply pressure to the pre-sintered ceramic coating. For example, during heating, the pre-sintered ceramic coating may undergo isotropic contraction, which may lead to defects in the coating. As another example, the pre-sintered ceramic coating may be relatively porous, such that ceramic particles may not bind as strongly with adjacent ceramic particles. To counteract this isotropic contraction and/or further densify the pre-sintered ceramic coating, the contact heating element may apply pressure to the pre-sintered ceramic coating, thereby creating relatively extreme temperature and pressure conditions with reduced temperatures in the underlying substrate.

In some examples, an article includes two or more ceramic composite substrate and a high temperature interface between the two or more substrates. To form the high temperature interface between the substrates, a mixture of ceramic particles and fibers may be applied to a surface of one or both substrates to form a pre-sintered ("green" or "brown") ceramic interface. To sinter the ceramic interface, the ceramic particles may be heated to a sintering temperature and maintained at the sintering temperature for a period of time until ceramic material of the ceramic particles migrate across particles to fuse the ceramic particles together. The ceramic interface may be relatively difficult to heat using localized heating methods. However, the sintering temperature for mobilizing the ceramic material may be relatively high, and the substrate underlying the coating may be damaged if maintained at the sintering temperature for a long period of time. For example, heating of the substrates and ceramic interface using an external heat source, such as a bulk heating or contact heating source, may expose the substrates to high temperatures for a long period of time while the ceramic interface reaches the sintering temperature.

According to various embodiments of the disclosure, high temperature interfaces described herein may be sintered using fast, localized joule heat using one or more contact electrical elements. A contact electrical element may contact a portion of the interface or the underlying substrate and generate joule heat in the interface or underlying substrate to heat the portion of the pre-sintered ceramic coating. Unlike bulk heating of the interface, which may heat the entire substrates to heat an interface between the substrates, joule heat generated and transferred by the underlying substrates may be localized to one or more portions of the pre-sintered ceramic coating. This localized heating may quickly sinter the relatively thin ceramic coating, such that the underlying substrate may receive a reduced amount of heat compared to bulk heating methods, as high temperatures in the substrate from the joule heating may be concentrated at near the surface of the substrate. The localized heat may also be applied discretely and without a large, heated environment, such that large substrates may be joined with the high temperature interfaces using a relatively low amount of energy.

High temperature coatings and interfaces described herein may be formed using localized, inexpensive heating processes that may sinter high temperature ceramics with reduced heating of the underlying component. As will be explained below, these localized heating processes may be used to form coatings on, or interfaces between, a wide variety of substrates, including large substrates and substrates having irregular surfaces. As one example, high temperature antioxidant coatings described herein may be used in aircraft brakes. Aircraft brakes may be subject to relatively high temperatures in oxidizing atmospheres, and may include components or features bonded together. FIG. 1 is a schematic diagram illustrating an example aircraft brake assembly including composite brake disc that include a high temperature coating formed in accordance with the techniques of this disclosure. For ease of description, examples of the disclosure will be described primarily with regard to aircraft brake assemblies. However, the articles of this disclosure may be used to form brake components other than aircraft brake discs. For example, the brake components may be used as friction materials in other types of braking applications and vehicles. Additionally, example articles of this disclosure may be used to form components that include a high temperature interface formed in accordance with the techniques of this disclosure. For example, two portions of a composite brake disc, such as two partially worn brake discs, may be bonded together using a high temperature interface. In other examples, the articles of this disclosure may be used to form high temperature joints or coatings for hypersonic or other high temperature structural applications.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seals 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38; rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against a compression point for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors and five stators. However, a different number of rotors and/or stators may be included in brake stack 16 in other examples.

In some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include coatings capable of operating at very high temperatures and blocking various oxidizing species.

Figure 2:
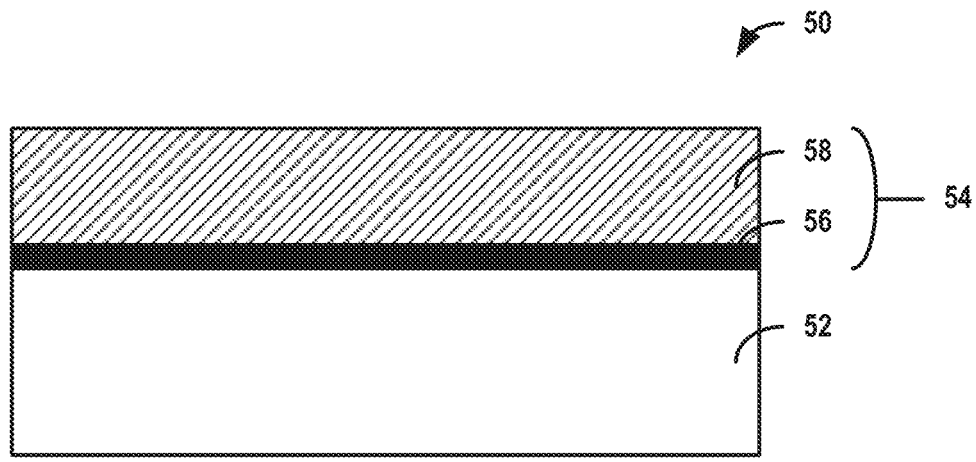
FIG. 2 is a schematic side view diagram of an example article that includes a high temperature coating formed in accordance with the techniques of this disclosure.

In some examples, articles or components, such as brake discs 36 and/or 38 of FIG. 1 described above, may include a high temperature coating to protect an underlying substrate from oxidation, such as non-friction surfaces of brake discs. FIG. 2 is a schematic side view diagram of an example article 50 that includes a high temperature coating formed in accordance with the techniques of this disclosure. Article 50 includes a ceramic composite substrate 52. Substrate 52 may include ceramic reinforcement fibers and a ceramic matrix material at least partially surrounding the ceramic-based reinforcement fibers. Examples of ceramic composite materials that may be used for substrates 52 may include, but are not limited to, carbon/carbon composites, carbon/silicon carbide composites, silicon carbide/silicon carbide composites, and the like. In some examples, substrate 52 may be formed form a porous preform that includes ceramic fibers or ceramic-precursor fibers. Examples of porous preforms that may be used to produce substrate 52 include, but are not limited to: a fibrous preform, such as a woven fiber preform, a nonwoven fiber preform, a chopped-fiber and binder preform, a binder-treated random fiber preform, a carbon fiber preform, or a ceramic fiber preform; a foam preform; a porous carbon body preform; or a porous ceramic body preforms.

In some examples, the porous preform used to produce substrate 52 includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In some examples, the layers include one or more tow layers, one or more web layers, or combinations thereof. Tow layers may include one or more tows of fibers. Tows of fibers may be arranged in any suitable arrangement including, for example, linear, radial, chordal, or the like. Web layers may include web fibers, which may include relatively short, chopped, and entangled fibers of fibers. In other examples, the porous preform may not include predefined layers, but, rather, may be formed from a bundle of fibers that are mechanically bound together, e.g., via needling. In other examples, a combination of any of the aforementioned types of porous preforms can be used.

Substrate 52 may also include a matrix material that at least partially encapsulates the ceramic fibers. The matrix material may be introduced into the porous preform using one or more of a variety of techniques, including, for example, chemical vapor deposition/chemical vapor infiltration (CVD/CVI), resin transfer molding (RTM), vacuum/pressure infiltration (VPI), high pressure impregnation/carbonization (PIC), or the like.

In some examples, substrate 52 may be conductive. For example, substrate 52 may include reinforcement fibers that may also electrically conduct an electrical current and produce joule heat in response to the electrical current. As will be described further below, this joule heating may enable substrate 52 to heat an overlying coating, such as coating 54, to a high temperature in a relatively short period of time. In some examples, substrate 52 may be non-conductive. For example, substrate 52 may include a ceramic matrix and reinforcement fibers that may not electrically conduct an electric current.

Substrate 52 may be subject to high temperatures during operation. As one example, carbon-carbon composite brake discs may be subject to temperatures as high as about 3,000 degrees Fahrenheit (° F.) (about 1,649° C.) during braking events. As another example, carbon-carbon composite rocket nozzle extensions may be subject to temperatures as high as about 4,500° F. (about 2,482° C.) during rocket engine operation. To protect substrate 52 from oxidation, article 50 includes a high temperature coating 54 on one or more surfaces of substrate 52. For example, high temperature coating 54 may be present on one or more non-friction or non-contact surfaces of substrate 52, such as non-friction surfaces of brake discs and/or non-friction surfaces of rocket nozzles.

High temperature coating 54 may be stable at temperatures greater than about 1000° C., such as temperatures greater than about 2000° C. In this context, "stable" may mean that high temperature coating 54 does not degrade into its constituent elements, does not react with carbon, and/or does not react with other elements or compounds present in the environment in which coating 54 is used including, but not limited to, oxidation. High temperature coating 54 may have any suitable thickness. In some examples, a thickness of high temperature coating 54 may be between about 0.0254 millimeters (mm) and about 10 mm. In some examples, a thickness of high temperature coating 54 may correspond to an application or expected length of service of article 50, such that a longer length of service may correspond to a higher thickness of high temperature coating 54.

In some examples, high temperature coating 54 may include an undercoat 56 on a surface of substrate 52 (e.g., directly on substrate 52 or indirectly on substrate 52 through one or more intermediate layers). Undercoat 56 may include one or more metal carbide layers. In some examples, undercoat 56 may include at least one of silicon carbide (SiC), titanium carbide (TiC), tungsten carbide (WC), zirconium carbide (ZrC), combinations thereof, or any carbide layer formed using the principles of the example processes described in U.S. Pat. Nos. 6,555,173 and/or 4,837,073, which are incorporated by reference herein in their entirety.

Undercoat 56 may be configured to reduce delamination, spallation, and/or cracking of high temperature coating 54. Undercoat 56 may experience high temperatures that may exacerbate shear forces caused by differences in coefficient of thermal expansion between undercoat 56 and either/both substrate 52 and/or an adjacent coating of overcoat 58. To maintain these forces relatively low, undercoat 56 may have a coefficient of thermal expansion that is relatively similar to a coefficient of thermal expansion of substrate 52, overcoat 58, or both. For example, undercoat 56 may have a coefficient of thermal expansion that is within a range between about 4 parts per million per degree Celsius (ppm/° C.) and about 4.5 ppm/° C. In some examples, undercoat 56 may be chemically compatible with substrate 52, overcoat 58, or both. For example, undercoat 56 may have a selected wettability relative to substrate 52, overcoat 58, or both.

In some examples, undercoat 56 may be configured to increase adhesion between high temperature coating 54 and substrate 52. For example, undercoat 56 may be formed from an in situ process that involves reaction between reactive carbon and metal in stoichiometric excess. The excess metal may form a metal oxide that may migrate into microcracks of substrate 52, undercoat 56, and/or overcoat 58 to provide a self-healing functionality. The metal oxide may more strongly adhere to the ceramic matrix of overcoat 58, and/or may be at least partially impregnated into open pores of substrate 52. Additionally or alternatively, undercoat 56 may have a relatively low thickness, such as less than about 20 micrometers, and/or consistent thickness, such as within about 10 micrometers, that is controlled by an amount of reactive carbon present on substrate 52.

Article 50 includes an overcoat 58 on a surface of substrate 52 and/or undercoat 56 (e.g., directly on undercoat 56 or indirectly on undercoat 56 through one or more intermediate layers). Overcoat 58 may be configured to reduce or prevent migration of reactive oxidizing species into substrate 52 at high temperatures. Overcoat 58 includes a ceramic matrix. The ceramic matrix may include any high temperature refractory ceramic material. A high temperature refractory ceramic material may include any ceramic material that maintains thermal and chemical stability at temperatures above about 1000° C. A composition of the ceramic matrix may be selected for a variety of properties including, but not limited to, a melting point of the ceramic material, a coefficient of thermal expansion of the ceramic material, a thermal conductivity of the ceramic material, and the like. For example, a melting point of the ceramic matrix in overcoat 58 may be higher than an anticipated temperature encountered at the corresponding overcoat 58 during operation of article 50.

In some examples, overcoat 58 may include a ceramic material having a relatively low coefficient of thermal expansion (CTE). For example, a CTE of substrate 52 and/or undercoat 56 may be relatively low. To reduce interlaminar forces between substrate 52 and/or undercoat 56, overcoat 58 may have a CTE that is relatively similar to a CTE of substrate 52 and/or undercoat 56. In some examples, overcoat 58 may include a ceramic material having a relatively high operating temperature, such as compared to substrate 52. A ceramic material having a relatively high operating temperature may have a relatively high melting temperature and/or thermal degradation temperature, such that article 50 may operate in an environment that may otherwise cause thermal degradation of substrate 52. In some examples, overcoat 58 may include a ceramic material having a high oxidation resistance. A ceramic material having a high oxidation resistance may have a relatively high density and/or low porosity, such that oxidizing species may less readily migrate through overcoat 58.

While described as a top coat, in some examples, overcoat 58 may be an intermediate layer with one or more additional coats on overcoat 58. For example, high temperature coating 54 may include an additional abradable coating, environmental barrier coating (EBC), thermal barrier coating (TBC), or other coating on overcoat 58. As one example, if substrate 52 includes an SiC/SiC substrate, overcoat 58 may include a complex oxide to protect substrate 52, with additional coating on overcoat 58 providing thermal protection (e.g., a more porous coating).

In some examples, overcoat 58 may include a complex oxide ceramic. Complex oxide ceramics may have a relatively low coefficient of thermal expansion, a relatively high operating temperature, a high oxidation resistance, and a relatively high resistance to steam attack at high temperatures. For example, complex oxide ceramics may have a CTE less than about $10 \times 10^{-6}$/° C. and a melting temperature greater than about 1500° C. Complex oxides ceramics may also include a large class of materials having a variety of different properties that may be tailored by changing composition. Example complex oxide ceramic materials may include, but are not limited to, rare earth oxides, such as refractory metal silicates; rare-earth monosilicates, such as ytterbium monosilicate or yttrium monosilicate; rare-earth di silicates, such as lutetium disilicate, erbium disilicate, scandium disilicate, holmium disilicate, ytterbium disilicate, yttrium disilicate; aluminum titanate; mullite; and the like.

In some examples, overcoat 58 includes a carbide, boride, or nitride ceramic. Carbide, boride, or nitride ceramics may have a relatively high operating temperature compared to complex oxide ceramics, may have a relatively low coefficient of thermal expansion and a high oxidation resistance, and may have a relatively high oxidation resistance (e.g., compared to carbon). For example, carbide, boride, and/or nitride ceramics may have a CTE less than about $10 \times 10^{-6}$/° C. and a melting temperature greater than about 2500° C. Example carbide, boride, and nitride ceramic materials may include, but are not limited to, hafnium carbide (HfC), hafnium nitride (HfN), hafnium diboride (HfB$_2$), tantalum carbide (TaC), tantalum diboride (TB$_2$), tantalum nitride (TaN), niobium carbide (NbC), niobium nitride (NbN), niobium diboride (NbB$_2$), zirconium carbide (ZrC), zirconium nitride (ZnN), zirconium diboride (ZrB$_2$), titanium carbide (TiC), titanium nitride (TiN), titanium diboride (TiB$_2$), silicon carbide (SiC), zirconium diboride and silicon carbide (ZrB$_2$-20% SiC), hafnium diboride and silicon carbide (HfB$_2$-20% SiC), tungsten carbide (WC), rhenium carbide (ReC), vanadium carbide (VC), vanadium nitride (VN), combinations thereof, and other refractory ceramic materials.

As will be described further below, overcoat 58 may be formed by applying a ceramic mixture as a pre-sintered ceramic coating to substrate 52 and sintering at least a portion of the pre-sintered ceramic coating by heating the portion of the pre-sintered ceramic coating to a sintering temperature of the ceramic particles in the pre-sintered ceramic coating, such as greater than about 1000° C. This heating may be performed locally using contact or non-contact joule heating, rather than bulk heating. In some instances, these local joule heating methods may permit formation of high temperature ceramic coatings 54 on a relatively large substrate 52, as such local heating methods may not require placement and heating in a furnace as in bulk heating methods.

Figure 3:
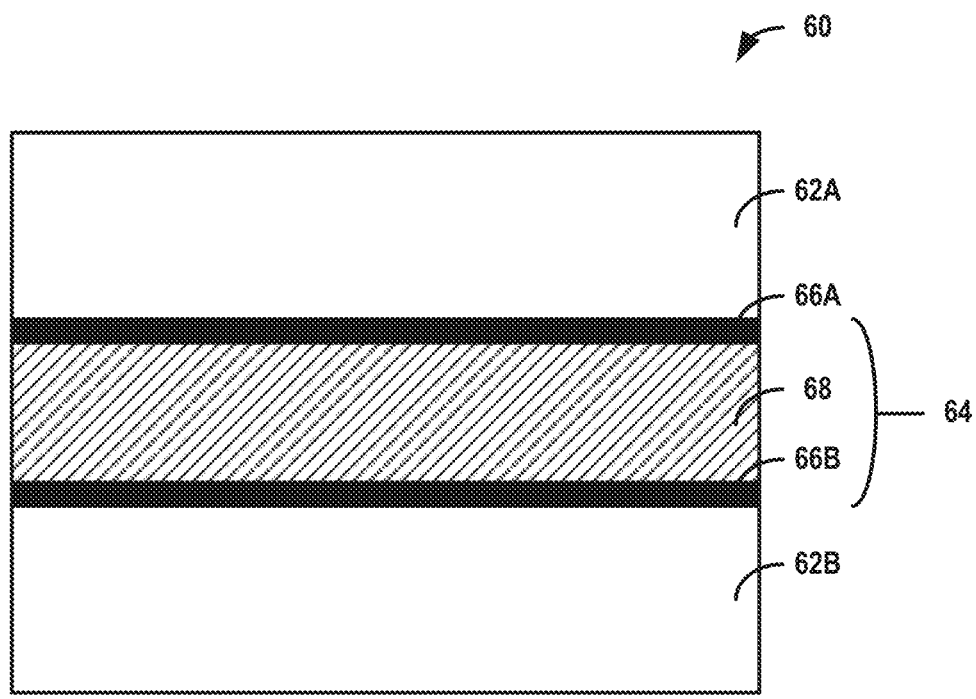
FIG. 3 is a schematic side view diagram of an example article that includes a high temperature joint formed in accordance with the techniques of this disclosure.

In some examples, articles or components, such as brake discs 36 and/or 38 of FIG. 1 described above, may include a high temperature interface to bond two or more substrates. As one example, composites that are relatively large or have relatively complex shapes may be fabricated as smaller and/or simpler shapes and bonded together. As another example, composites that are partially worn, such as partially worn brake discs, may be bonded together to recycle and/or refabricate the composites. FIG. 3 is a schematic side view diagram of an example article 60 that includes a high temperature interface 64 formed in accordance with the techniques of this disclosure. Article 60 includes a first ceramic composite substrate 62A and a second ceramic composite substrate 62B (individually "substrate 62" and collectively "substrates 62"). Unless otherwise specified, each substrate 62 may be functionally and/or compositionally similar to substrate 52 of FIG. 2.

One or both substrates 62 may be subject to high temperatures during operation. To bond substrate 62A and substrate 62B together, article 60 includes a high temperature interface 64 between one or more surfaces of substrate 62A and substrate 62B. Interface 64 may have any suitable thickness. A thickness of interface 64 may be related to a roughness of the one or more surfaces of substrates 62, a type of material (e.g., matrix and/or fibers) of substrates 62, and other properties that may affect a contact area and/or adhesion of substrates 62. In some examples, a thickness of interface 64 may be between about 0.0254 millimeters (mm) and about 5 mm. In some examples, a thickness of interface 64 may correspond to a surface roughness or tolerance of substrates 62, such that a higher surface roughness may correspond to a higher thickness of interface 64.

In some examples, interface 64 may include an undercoat 66A on an interface surface (i.e., a surface intended to interface with another component) of substrate 62A and/or an undercoat 66B on an interface surface of substrate 62B (e.g., directly on substrates 62 or indirectly on substrates 62 through one or more intermediate layers) (individually "undercoat 66" and collectively "undercoats 66"). Unless otherwise specified, each undercoat 66 may be functionally and/or compositionally similar to undercoat 56 of FIG. 2.

Interface 64 may include an interface layer 68 between the interface surfaces of substrates 62A and 62B and/or undercoats 66A and 66B. Interface layer 68 may be configured to bond substrates 62 together for improved adhesion during operation at relatively high temperatures. Interface layer 68 includes a high temperature ceramic matrix. The ceramic matrix may include any high temperature refractory ceramic material compatible with substrate 62. A high temperature refractory ceramic material may include any ceramic material that maintains thermal and chemical stability at temperatures above about 1000° C. A composition of the ceramic matrix may be selected for a variety of properties including, but not limited to, a melting point of the ceramic material, a coefficient of thermal expansion of the ceramic material, a thermal conductivity of the ceramic material, and the like. For example, a melting point of the ceramic matrix in interface layer 68 may be higher than an anticipated temperature encountered at interface layer 68 during operation of article 60.

In some examples, undercoats 66 may be configured to increase adhesion between high temperature interface 64 and substrates 62. For example, one or both undercoats 66 may be formed from an in situ process that involves reaction between reactive carbon and metal in stoichiometric excess. The excess metal may form a metal oxide that may migrate into microcracks of substrate 62, undercoat 66, and/or interface layer 68. The metal oxide may strongly adhere to the ceramic matrix of interface layer 68, and/or may be at least partially impregnated into open pores of substrates 62. As a result, interface 64 may form a strong bond between substrates 62.

In some examples, interface layer 68 may include a ceramic material having a relatively low coefficient of thermal expansion (CTE). For example, a CTE of substrates 62 and/or undercoats 66 may be relatively low. To reduce interlaminar forces between substrates 62 and/or undercoats 66, interface layer 68 may have a CTE that is relatively similar to a CTE of substrates 62 and/or undercoats 66. In some examples, interface layer 68 may include a ceramic matrix that includes a complex oxide ceramic such as those complex oxide ceramics described above for overcoat 58. For example, as explained above with respect to overcoat 58 of FIG. 2, complex oxide ceramics may have a relatively low coefficient of thermal expansion, a relatively high operating temperature, and a high oxidation resistance. For example, complex oxide ceramics may have a CTE less than about $10 \times 10^{-6}/°$ C. and a melting temperature greater than about 1500° C. Example complex oxide ceramic materials may include, but are not limited to, rare earth oxides, such as refractory metal silicates; rare-earth monosilicates, such as ytterbium monosilicate or yttrium monosilicate; rare-earth disilicates, such as lutetium disilicate, erbium disilicate, scandium disilicate, holmium disilicate, ytterbium disilicate, yttrium disilicate; aluminum titanate; mullite; and the like.

Interface layer 68 may include reinforcement fibers distributed throughout the ceramic matrix to provide mechanical strength to interface layer 68. The fibers may be selected according to electrical conductivity, thermal conductivity, mechanical properties, mechanical/chemical compatibility with matrix materials, and the like. Example fibers may include, but are not limited to, carbon/carbon fibers, silicon carbide fibers, and the like. In some examples, the fibers may be electrically and/or thermally conductive fibers. For example, as will be explained further below, the electrically and/or thermally conductive fibers may be configured to generate joule heat in response to a current and/or conduct heat through interface layer 68 during sintering of a pre-sintered ceramic interface to form interface layer 68. As such, the conductive fibers may have a size, shape, composition, and/or concentration sufficient to generate and/or conduct joule heat through interface layer 68 to heat a plurality of ceramic particles that ultimately form the ceramic matrix of interface layer 68. The conductive fibers may be present in a relatively homogeneous distribution and at a concentration above a percolation threshold, such that the conductive fibers may conduct electricity through a bulk of interface layer 68.

In some examples, the conductive fibers of interface layer 68 may be configured to generate heat in response to receiving an electrical current. For example, as will be described further below, interface layer 68 may be formed by applying a ceramic mixture that includes the conductive fibers and a plurality of ceramic particles as a pre-sintered ceramic interface to at least one of substrate 62A and/or 62B, positioning substrates 62 together with the ceramic mixture between the two substrates 62, and sintering at least a portion of the ceramic mixture by heating the portion of the ceramic mixture to a sintering temperature of the plurality of ceramic particles, such as greater than about 1000° C. This heating may be performed locally by applying a current to the portion of the ceramic mixture. In response to the current, the conductive fibers in the applied mixture may heat up and transfer at least a portion of the heat to the surrounding ceramic mixture to the sintering temperature to join substrates 62.

In some examples, in addition or alternative to generating heat through joule heating, the conductive fibers may be configured to conduct heat received from one or both substrates 62A and 62B (e.g., in response to substrates 62A and/or 62B receiving an electrical current). For example, as will be described further below, interface layer 68 may be formed by applying a current to one or both substrates 62 to generate joule heat in one or both substrates 62. At least a portion of this generated heat may be transferred to a portion of a pre-sintered ceramic interface (e.g., as described above) between substrate 62 to heat the portion of the pre-sintered ceramic interface to a sintering temperature of the plurality of ceramic particles, such as greater than about 1000° C., thereby sintering the portion of the pre-sintered ceramic coating. In some instances, the conductive fibers may conduct and distribute this generated heat through the plurality of ceramic particles of the pre-sintered ceramic interface to sinter the portion of the pre-sintered ceramic coating in a relatively short amount of time.

In some examples, the conductive fibers may provide other properties to interface layer 68. For example, the conductive fibers may have a size, shape, composition, and/or concentration that improves a strength of interface layer 68 or results in a particular coefficient of thermal expansion of interface layer 68, such as through a combination of properties of the conductive fibers and the ceramic matrix of interface layer 68.

High temperature coatings described herein may be formed from a pre-sintered ceramic coating that is sintered using fast, localized joule heating. FIGS. 4A-C, 5A-5C, and 6A-6C describe various systems and techniques for forming high temperature coatings, such as overcoat 58 of FIG. 2. While described individually, these systems and techniques may be used in combination, such as in parallel (e.g., contact and non-contact, heating contact and electrical contact, conductive and radiative, and the like) or sequentially (e.g., a first stage of one heating mechanism and a second stage of another heating mechanism).

Figure 4A:
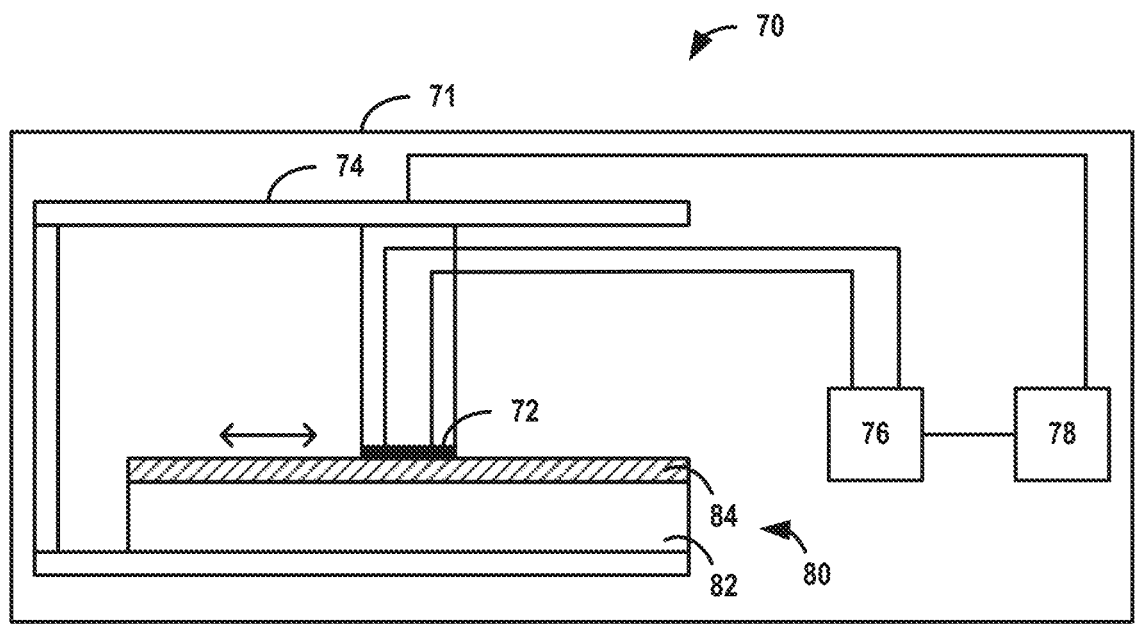
FIG. 4A is a conceptual side view diagram illustrating an example system for forming a high temperature coating using a contact heating element in accordance with the techniques of this disclosure.

In some examples, high temperature coatings described herein may be formed as a pre-sintered ceramic coating and sintered through one or more external heating sources that may concentrate heat locally at a particular portion of the pre-sintered ceramic coating and expose the underlying substrate to relatively low heat loads compared to bulk heating methods. FIG. 4A is a conceptual diagram illustrating an example system 70 for forming a high temperature coating on a substrate using a contact heating element in accordance with the techniques of this disclosure. An article 80 includes a substrate 82 and a pre-sintered ceramic coating 84 on a surface of substrate 82. Substrate 82 may be a ceramic composite substrate, and unless otherwise specified, may be functionally and/or compositionally similar to substrate 52 of FIG. 2. Substrate 82 may include an undercoat (not shown), such as undercoat 56 of FIG. 2. Pre-sintered ceramic coating 84 may represent a less-than-fully-sintered preform of a high temperature coating, and may be sintered to form a high temperature coating, such as overcoat 58 of FIG. 2.

In the example of FIG. 4A, pre-sintered ceramic coating 84 may be formed on a surface of substrate 82. For example, as will be explained further below, a ceramic mixture that includes a plurality of ceramic particles may be applied to the surface of substrate 82 and dried to form pre-sintered ceramic coating 84. While referred to as "pre-sintered," pre-sintered ceramic coating 84 may be partially sintered, such that "pre-sintered" may represent an intermediate state before being substantially sintered. For example, pre-sintered ceramic coating 84 may include some particle necking, but may be less than fully densified. In some instances, pre-sintered ceramic coating 84 may have a relative density of less than about 90%, while a fully sintered ceramic coating may have a relative density of greater than about 90%.

Pre-sintered ceramic coating 84 may include a plurality of ceramic particles configured to withstand high temperatures experienced during operation of article 80. The plurality of ceramic particles may have a composition that corresponds to a desired composition of a high temperature coating, such as overcoat 58 of FIG. 2. For example, the plurality of ceramic particles may include any of the ceramic materials of overcoat 58 described in FIG. 2, including complex oxide ceramics, a carbide ceramic, a boride ceramic, and/or a nitride ceramic. These ceramic particles may be present as relatively discrete unbonded or partially bonded particles. Coating 84 may have any thickness corresponding to an antioxidant coating, such as high temperature coating 54 of FIG. 2, sufficient to protect substrate 82 from oxidation. In some examples, coating 84 has a thickness of about 0.05 millimeters (mm) to about 20 mm. In some examples, pre-sintered ceramic coating 84 has a thickness corresponding to a sintered coating thickness of about 0.0254 mm to about 10 mm.

System 70 may be configured to sinter one or more portions of pre-sintered ceramic coating 84. System 70 includes one or more contact heating elements 72. While contact heating element 72 is illustrated as a single contact heating element, any number of contact heating elements may be used. Contact heating element 72 may include any heating element capable of contacting a surface of pre-sintered ceramic coating 84 and heating a portion of pre-sintered ceramic coating 84 to a sintering temperature of the plurality of ceramic particles within pre-sintered ceramic coating 84. The portion of pre-sintered ceramic coating 84 may be a discrete portion that is less than an entire surface of pre-sintered ceramic coating 84 such that, while the entire pre-sintered ceramic coating 84 may be eventually sintered, the sintering may be completed by heating pre-sintered ceramic coating 84 on a portion by portion basis rather than all at once, as in a bulk heating process.

Contact heating element 72 may include one or more contact surfaces configured to contact a surface of pre-sintered ceramic coating 84. While contact heating element 72 is illustrated as a flat element, contact heating element 72 may include one or more heating surfaces having any contour. As one example, to discretely contact one or more surface portions of pre-sintered ceramic coating 84, contact heating element 72 may include a stamp matching a contour of at least a portion of substrate 82 (e.g., a flat surface). As another example, to continuously contact one or more surface portions of pre-sintered ceramic coating 84, contact heating element 72 may include a roller configured to roll across substrate 82, such as through an actuation system 74.

Contact heating element 72 may be configured to heat the plurality of ceramic particles of pre-sintered ceramic coating 84 to a sintering temperature of the plurality of ceramic particles. For example, contact heating element 72 may be configured to contact pre-sintered ceramic coating 84 for a particular amount of time that is sufficient to reach and maintain the sintering temperature within pre-sintered ceramic coating 84, such that substantially all the plurality of ceramic particles in a volume of pre-sintered ceramic coating 84 proximate to the contacted portion of coating 84 are sintered. The sintering temperature may be greater than about 1000° C., such as for complex oxides, or greater than about 2000° C., such as for carbides, nitrides, and/or borides.

Contact heating element 72 may be a joule heating element configured to heat a portion of pre-sintered ceramic coating 84 using indirect joule heating. Contact heating element 72 may include one or more conductors configured to receive electrical current from power source 76 and generate resistive heat from the electrical current, such as through inherent resistivity of the one or more conductors. Contact heating element 72 may be configured to transfer at least a portion of this generated joule heat to the plurality of ceramic particles in the ceramic mixture through conduction to heat the plurality of ceramic particles at or above the sintering temperature. While a portion of the generated heat may further transfer to substrate 82, this portion of the generated heat may be relatively constrained to a surface of substrate 82.

Contact heating element 72 may be electrically coupled to a power source 76. Power source 76 may be configured to supply electrical power to contact heating element 72 to generate joule heat from contact heating element 72. Power source 76 may be communicatively coupled to controller 78. Power source 76 may be configured to receive control signals from controller 78 and deliver electrical current to contact heating element 72 based on the control signals.

System 70 may include an enclosed chamber 71 around components of system 70. Enclosed chamber 71 may be configured to house article 80 and maintain an inert or vacuum atmosphere in a volume of enclosed chamber 71. For example, substrate 82 at high temperatures may be oxidized by reactants in air.

System 70 may include actuation system 74 configured to generate relative movement between contact heating element 72 and article 80. As one example, contact heating element 72 may be coupled to actuation system 74 and configured to move with respect to a stationary article 80. As another example, contact heating element 72 may be fixed and article 80 may be positioned on a conveyer or other component configured to move article 80. Actuation system 74 may be communicatively coupled to a controller 78. For example, actuation system 74 may include one or more actuators configured to receive control signals from controller 78 and move one or both of contact heating element 72 and/or article 80 according to various parameters, such as a speed of relative movement, an x/y-axis position on article 80 for planar substrates 82 or an x/y/z-axis position on article 80 for non-planar substrates 82, or other parameters based on relative movement between contact heating element 72 and/or article 80 that may be based on a time of heat treatment or portion of article 80.

System 70 includes controller 78. Controller 78 may be configured to control operation of components of system 70 to sinter one or more portions of pre-sintered ceramic coating 84. Controller 78 may include any of a wide range of devices, including processors including processing circuitry (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like.

In some examples, controller 78 may be configured to control power source 76. For example, controller 78 may be configured to send control signals to power source 76 to control power source 76 to power contact heating element 72, such as to a particular power level or temperature. In some examples, controller 78 may be configured to control relative movement between contact heating element 72 and article 80. For example, controller 78 may be configured to send control signal to actuation system 74 to control a relative position of contact heating element 72 to heat different portions of pre-sintered ceramic coating 84 and/or heat a portion of pre-sintered ceramic coating 84 for a particular amount of time.

Figure 4B:
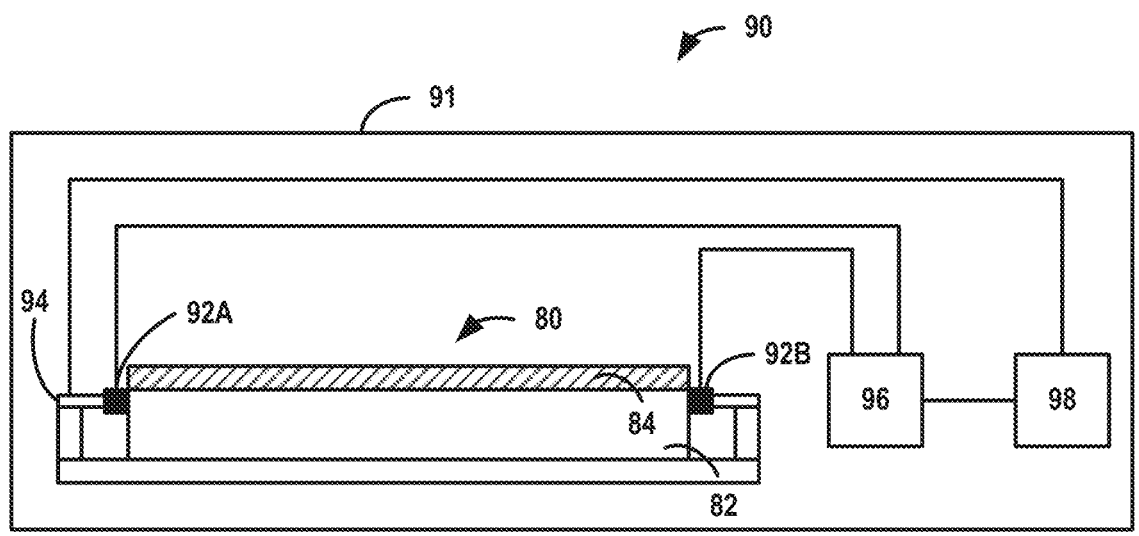
FIG. 4B is a conceptual side view diagram illustrating another example system for forming a high temperature coating using a contact electrical element in accordance with the techniques of this disclosure.

In some examples, high temperature coatings described herein may be formed as a pre-sintered ceramic coating and sintered through an adjacent substrate that may concentrate heat locally at a surface of the substrate near the pre-sintered ceramic coating and leave other portions of the substrate at relatively low temperatures compared to bulk heating methods. FIG. 4B is a conceptual diagram illustrating an example system 90 for forming a high temperature coating using contact electrical elements in accordance with the techniques of this disclosure. FIG. 4B will be described with respect to article 80 of FIG. 4A above, including substrate 82 and coating 84. System 90 includes an enclosed chamber 91, an actuation system 94, a power source 96, and a controller 98 that, unless otherwise specified, may be functionally and/or compositionally similar to enclosed chamber 71, actuation system 74, power source 76, and controller 78 of FIG. 4A.

System 90 may be configured to sinter one or more portions of pre-sintered ceramic coating 84 using joule heat generated in substrate 82. System 90 includes one or more contact electrical elements 92A and 92B (individually "contact electrical element 92" and collectively "contact electrical elements 92"). While contact electrical elements 92 are illustrated as two contact electrical elements, any number of contact electrical elements may be used. Contact electrical elements 92 may include any electrical element capable of contacting substrate 82 directly and heating a surface portion of substrate 82 to heat the overlying pre-sintered ceramic coating 84 to a sintering temperature of the plurality of ceramic particles of coating 84. Contact electrical elements 92 may include surfaces configured to contact substrate 82, such as directly on a surface of substrate 82. While contact electrical elements 92 is illustrated as a flat element, contact electrical elements 92 may include an electrical contact surface having any contour.

Contact electrical element 92 may be configured to directly deliver a current to substrate 82 to heat a surface portion of substrate 82 and, correspondingly, heat the plurality of ceramic particles of pre-sintered ceramic coating 84 to a sintering temperature of the plurality of ceramic particles. The sintering temperature may be greater than about 1000° C., such as for complex oxides, or greater than about 2000° C., such as for carbides, nitrides, and/or borides.

Contact electrical elements 92 may be electrically coupled to power source 96. Power source 96 may be configured to supply or receive electrical power to and from contact electrical elements 92 for delivery to substrate 82 to generate heat from substrate 82. Power source 96 may be communicatively coupled to controller 98 and configured to receive control signals from controller 98 and deliver electrical current to contact electrical elements 92 based on the control signals.

Contact electrical elements 92 may include one or more electrical contacts configured to deliver electrical current to a portion of substrate 82. For example, the one or more electrical contacts may be configured to contact substrate 82, receive electrical current from power source 96, and deliver the electrical current to a portion of substrate 82. Substrate 82 may include ceramic material, such as ceramic fibers and/or a ceramic matrix, that may generate resistive heat from the electrical current, such as through inherent resistivity of the ceramic materials. This electrical current and corresponding heating may be concentrated close to a surface of substrate 82 near coating 84, such that substrate 82 may be configured to transfer at least a portion of this generated heat to the plurality of ceramic particles in coating through conduction to heat the plurality of ceramic particles at or above the sintering temperature. While a portion of the generated heat may further transfer to other portions of substrate 82, this portion of the generated heat may be relatively low and constrained to near a surface of substrate 82.

In some examples, actuation system 94 may be configured to control relative movement between contact electrical elements 92A and 92B. A relative distance between contact electrical element 92A and 92B may be related to a rate of heating and/or a surface area of a portion of pre-sintered ceramic coating 84 being heated. Actuation system 94 may include one or more actuators configured to receive control signals from controller 98 and move one or both of contact electrical elements 92 and/or article 80 according to various parameters, such as a speed of relative movement, an x/y-axis position on article 80 for planar substrates 82 or an x/y/z-axis position on article 80 for non-planar substrates 82, a distance between contact electrical elements 92, or other parameters based on relative movement between contact electrical element 92 and/or article 80 that may be based on a time of heat treatment or portion of article 80.

In some examples, controller 98 may be configured to control power source 96. For example, controller 98 may be configured to send control signals to power source 96 to control power source 96 to deliver current to substrate 82, such as to a particular temperature. In some examples, controller 98 may be configured to control relative movement between contact electrical elements 92 and article 80, such that controller 98 may control a relative position of contact electrical elements 92 to heat different portions of pre-sintered ceramic coating 84. In some examples, controller 98 may be configured to control a distance between contact electrical elements 92. For example, a rate of joule heating may be inversely proportional to a distance between contact electrical elements 92, while a size of a portion heated by joule heating may be directly proportional to the distance between contact electrical elements 92. As such, controller 98 may be configured to control at a rate of joule heating and/or a size of a portion of pre-sintered ceramic coating 84 heated based on the distance between contact electrical elements 92, as well as other factors affecting a rate of joule heating and/or a size of the portion of pre-sintered ceramic coating 84, such as an amount of electrical power from power source 96 and/or a rate of relative movement between contact electrical elements 92 and article 80.

Figure 4C:
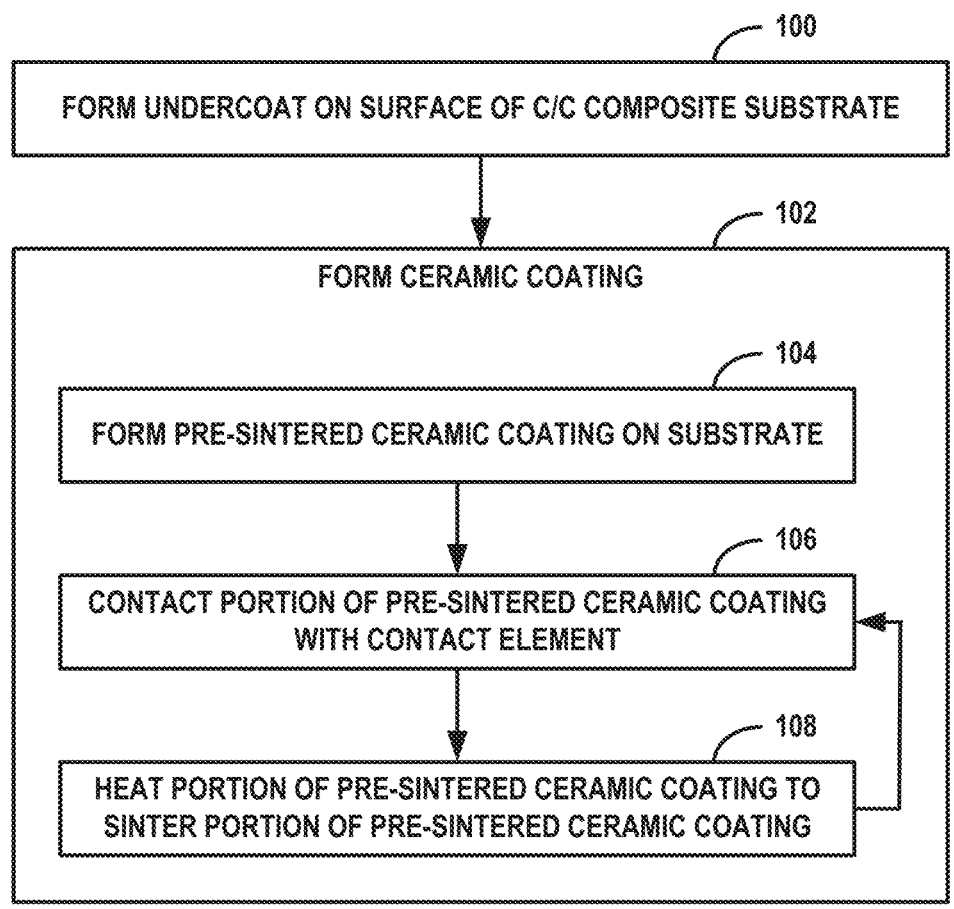
FIG. 4C is a flow diagram illustrating an example technique for forming a high temperature coating using a contact element in accordance with the techniques of this disclosure.

FIG. 4C is a flow diagram illustrating an example technique for forming a high temperature coating using a contact element, such as contact heating element 72 of FIG. 4A or contact electrical elements 92 of FIG. 4B, to sinter a pre-sintered ceramic coating using joule heat, in accordance with the techniques of this disclosure. FIG. 4C will be described with respect to system 70 of FIG. 4A and system 90 of FIG. 4B; however, other systems may be used to implement the examples of FIG. 4C, such as systems that implement another type of heating to locally heat a pre-sintered ceramic coating on a ceramic composite substrate.

In some examples, the method of FIG. 4C may include forming an optional undercoat, such as crystallized metal carbide undercoat 56 of FIG. 2, on a surface of ceramic composite substrate 82 (100). In some examples, the undercoat may be formed in situ using a metal-rich combination of one or more carbon coatings and one or more metal coatings. Forming the undercoat may include cleaning the surface of substrate 82, applying a reactive carbon coating on the surface of substrate 82, such as through brush coating, and drying the carbon coating. Forming the undercoat may further include applying a metal coating on the carbon coating and drying the metal coating. The metal coating may be applied at a metal-rich, stoichiometric excess. Forming the undercoat may further include heating the carbon coating and metal coating to a heat treatment temperature. The heat treatment temperature may be sufficiently high to mobilize the metal of the metal coating, such as through melting, and react the metal with the carbon of the carbon coating to form a crystallized metal carbide. The metal carbide may be further heated to further alter the microstructure, phase composition, or other properties or characteristics of the metal carbide. Excess metal from the metal coating may migrate into pores of substrate 82. The resulting undercoat may include a metal carbide portion on the surface of substrate 82 and a metal portion extending into substrate 82.

The method of FIG. 4C may include forming a high temperature coating, such as high temperature coating 54 of FIG. 2, on substrate 82 (or other layer overlying substrate 82, such as an undercoat) (102). The method of FIG. 4C may include forming pre-sintered ceramic coating 84 on a surface of ceramic composite substrate 82 (104). In some examples, forming pre-sintered ceramic coating 84 may include applying a ceramic mixture to a surface of substrate 82. The ceramic mixture may include a plurality of ceramic particles and a distribution medium, such that the ceramic mixture may be applied as a paste, slurry, or other fluid mixture. The ceramic mixture may be pre-processed prior to sintering to form pre-sintered ceramic coating 84. For example, the ceramic mixture may be dried to remove the distribution medium and pre-fired at a relatively low temperature to burn off volatiles and form pre-sintered (or partially sintered) ceramic coating 84. In some instances, the ceramic mixture may be partially sintered to form a green or brown preform as pre-sintered ceramic coating 84.

The method of FIG. 4C may include sintering at least a portion of pre-sintered ceramic coating 84 by heating the portion of pre-sintered ceramic coating 84, using joule heating, to a sintering temperature of pre-sintered ceramic coating 84 (106). For example, in contrast to bulk heating, in which a surrounding gas in a furnace may heat an article using convection, joule heating may produce relatively concentrated heat in conductors. This relatively concentrated heat may be controlled such that the plurality of ceramic particles of pre-sintered ceramic coating 84 may reach a sintering temperature in a relatively short amount of time, while portions of substrate 82 that are not adjacent to coating 84 may remain at lower temperatures as coating 84 is sintered. In some examples, pre-sintered ceramic coating may be sintered in less than about one minute. In some examples, the sintering temperature may be greater than about 1000° C. In some examples, an average bulk temperature of substrate 82 may be at least about 100° C. less than an average bulk temperature of coating 84 during sintering.

To sinter pre-sintered ceramic coating 84, the plurality of ceramic particles may be heated to a sintering temperature and maintained at the sintering temperature, such that sintering may occur through any variety of processes including, but not limited to, solid state sintering, liquid phase sintering, reaction bonding, or any other type of sintering mechanism or combination of sintering mechanisms. As such, sintering pre-sintered ceramic coating 84 may be controlled through operating conditions such as a temperature of or power delivered to contact heating element 72 or contact electrical elements 92, a temperature of pre-sintered ceramic coating 84 (e.g., measured by a temperature sensor or determined based on other factors), an amount of contact time between contact heating element 72 or contact electrical elements 92, and other factors that relate to an amount and rate of heat delivery to pre-sintered ceramic coating 84.

In some examples, sintering the portion of pre-sintered ceramic coating 84 may include heating pre-sintered ceramic coating 84 using one or more external heating sources, such as contact heating element 72, that may concentrate heat locally at pre-sintered ceramic coating 84 and leave underlying substrate 82 at relatively low temperatures compared to bulk heating methods. Referring also to FIG. 4A, the method of FIG. 4C may include contacting a portion of pre-sintered ceramic coating 84 with a joule heating element, such as contact heating element 72 (106). For example, controller 78 may send out control signals to actuation system 74 to control relative movement between contact heating element 72 and article 80, such that contact heating element 72 contacts a particular portion of pre-sintered ceramic coating 84. The method of FIG. 4C may include powering contact heating element 72 to heat the portion of pre-sintered ceramic coating to or above the sintering temperature (108). For example, controller 78 may send control signals to power source 76 to power contact heating element 72 at a particular power level, to a particular temperature, and/or for a particular amount of time to achieve the sintering temperature in coating 84 to substantially sinter the plurality of ceramic particles of coating 84.

In some examples, sintering the portion of pre-sintered ceramic coating 84 may include heating pre-sintered ceramic coating 84 using adjacent substrate 82 that may concentrate heat locally at a surface of substrate 82 near coating 84 and leave other portions of substrate 82 at relatively low temperatures compared to bulk heating methods. Referring also to FIG. 4B, the method of FIG. 4C may include contacting a portion of pre-sintered ceramic coating 84 with a contact element, such as contact electrical elements 92 (106). For example, controller 98 may send out control signals to actuation system 94 to control relative movement between contact electrical elements 92 and article 80, such that contact electrical elements 92 contact a particular portion of substrate 82 corresponding to a desired portion of pre-sintered ceramic coating 84. The method of FIG. 4C may include applying a current to substrate 82 to heat the portion of pre-sintered ceramic coating to or above the sintering temperature (108). For example, controller 98 may send control signals to power source 96 to deliver current to contact electrical elements 92 to achieve a particular temperature of substrate 82 and/or for a particular amount of time to achieve the sintering temperature in coating 84 to substantially sinter the plurality of ceramic particles of coating 84.

In some examples, heating pre-sintered ceramic coating 84 may include two or more stages of heating. For example, pre-sintered ceramic coating 84 may be heated in a first bulk heating stage to a relatively low temperature, such as between about 500° C. and about 1000° C., such that substrate 82 may not receive thermal damage. Pre-sintered ceramic coating 84 may be heated in a second local heating stage to a relatively high sintering temperature. The first bulk heating stage may enable pre-sintered ceramic coating 84 to reach a high sintering temperature, such as greater than about 2000° C., which may not otherwise be possible using either bulk heating or localized heating.

In some examples, the method of FIG. 4C may include sintering one or more other portions of pre-sintered ceramic coating 84. For example, controllers 78 and/or 98 may control a respective actuation system 74 or 94 to control respective contact heating element 72 or contact electrical elements 92 to contact a different portion of coating 84 and/or substrate 82 and heat the one or more other portions of coating 84 to a sintering temperature of the ceramic particles.

In some examples, pre-sintered ceramic coating 84 may be sintered in discrete portions. For example, a particular surface area defined by contact heating element 72 or contact electrical elements 92 may be heated, followed by repositioning of contact heating element 72 or contact electrical elements 92 relative to article 80 to heat a different portion of coating 84 such that a particular portion of coating 84 may be heated for a particular amount of time corresponding to an amount of contact time between contact heating element 72 or contact electrical element 92 and article 80.

In some examples, pre-sintered ceramic coating 84 may be sintered continuously. For example, a particular surface area defined by contact electrical elements 92 may be continuously moved across a surface of coating 84, such that a particular portion of coating 84 may be heated for a particular amount of time corresponding to a rate of relative movement between contact electrical element 92 and article 80.

Figure 5A:
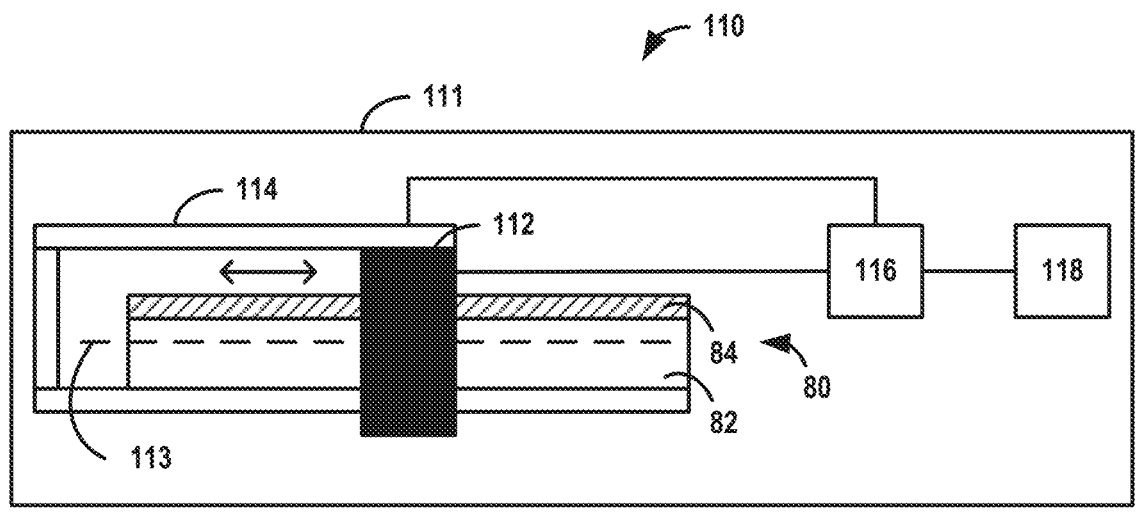
FIG. 5A is a conceptual side view diagram illustrating an example system for forming a high temperature coating using a non-contact radiative heating element in accordance with the techniques of this disclosure.
Figure 5B:
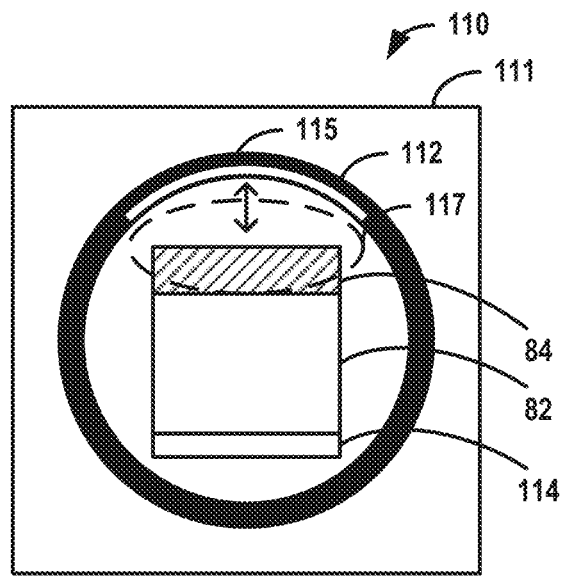
FIG. 5B is a conceptual side view diagram illustrating the example system of FIG. 5A in accordance with the techniques of this disclosure.

In some examples, high temperature coatings described herein may be formed as a pre-sintered ceramic coating and sintered using one or more external non-contact radiative heating sources that may concentrate heat locally at the coating and maintain the underlying substrate, including substrates having contoured surfaces, at relatively low temperatures compared to bulk heating methods and/or with relatively little contact stress compared to contact heating methods. FIG. 5A is a conceptual side view diagram illustrating an example system 110 for forming a high temperature coating using a non-contact radiative heating element, while FIG. 5B is a conceptual front view diagram illustrating example system 110 of FIG. 5A, in accordance with the techniques of this disclosure. FIGS. 5A and 5B will be described with respect to article 80 of FIG. 4A above, including substrate 82 and coating 84. System 110 includes an enclosed chamber 111, an actuation system 114, a power source 116, and a controller 118 which, unless otherwise specified, may be functionally and/or compositionally similar to enclosed chamber 71, actuation system 74, power source 76, and controller 78 of FIG. 4A.

In some examples, pre-sintered ceramic coating 84 may include one or more features that limit an ability of contact heating methods, such as those described in FIGS. 4A-4C, to adequately sinter a pre-sintered ceramic coating. As one example, pre-sintered ceramic coating 84 may have a relatively complex shape and/or relatively complex surfaces corresponding to surfaces of underlying substrate 82, such that contact heating methods may not be capable of or economical for heating a pre-sintered ceramic coating on the substrate. As another example, ceramic coating 84 may be relatively fragile, such that contact heating methods may damage coating 84.

System 110 may be configured to sinter one or more portions of pre-sintered ceramic coating 84 using radiation from a joule heat source and without contacting surfaces of pre-sintered ceramic coating 84. System 110 includes one or more non-contact radiative heating elements 112. While non-contact radiative heating element 112 is illustrated as a single non-contact radiative heating element, any number of contact electrical elements may be used. Non-contact radiative heating element 112 may include any radiative element capable of heating pre-sintered ceramic coating 84 to a sintering temperature of the plurality of ceramic particles of coating 84.

In the example of FIGS. 5A and 5B, non-contact radiative heating element 112 includes a movement axis 113 through a volume defined by non-contact radiative heating element 112. Movement axis 113 may define a bulk movement path of article 80 through or past non-contact radiative heating element 112, though movement of article 80 perpendicular to movement axis 113 may tune a distance between pre-sintered ceramic coating 84 and the one or more radiative surfaces 115 of non-contact radiative heating element 112.

Non-contact radiative heating element 112 may be configured to heat the plurality of ceramic particles of pre-sintered ceramic coating 84 to a sintering temperature of the plurality of ceramic particles. The sintering temperature may be greater than about 1000° C., such as for complex oxide ceramics, or greater than about 2000° C., such as for carbide, nitride, and/or boride ceramics. Non-contact radiative heating element 112 may be electrically coupled to power source 116 configured to supply electrical power to non-contact radiative heating element 112 to generate heat from non-contact radiative heating element 112.

In some examples, non-contact radiative heating elements 112 may include one or more radiative surfaces 115 oriented radially inward (e.g., to a movement axis 113) and configured to emit and/or reflect radiation at one or more surfaces of pre-sintered ceramic coating 84. For example, one or more radiative surfaces 115 may be distributed around or next to movement axis 113. While non-contact radiative heating element 112 is illustrated as a tubular element, non-contact radiative heating element 112 may include one or more radiative surfaces 115 having any contour or position. For example, non-contact radiative heating element 112 may include one or more radiative surfaces 115 on only a portion of non-contact radiative heating element 112, such as a portion configured to be proximate to pre-sintered ceramic coating 84 as article 80 moves along movement axis 113.

Non-contact radiative heating element 112 may include one or more infrared heating elements configured to heat a portion of pre-sintered ceramic coating 84 using radiation produced by joule heating. For example, non-contact radiative heating element 112 may include one or more resistors configured to receive electrical current from power source 116 and generate radiative heat from the electrical current, such as through inherent radiation emitted from the one or more resistors or reflected from reflective surfaces. Non-contact radiative heating element 112 may be configured to transfer at least a portion of this radiation to the plurality of ceramic particles in the ceramic mixture to heat the plurality of ceramic particles at or above the sintering temperature. While a portion of the generated heat may further transfer to substrate 82, this portion of the generated heat may be relatively low due to a short amount of time to sinter pre-sintered ceramic coating 84 or a distance of substrate 82 from radiative surfaces 115 of non-contact radiative heating element 112, and may be relatively constrained to a surface of substrate 82.

In some examples, non-contact radiative heating element 112 may be configured to create a variable temperature profile along, across, and/or around an axis of non-contact radiative heating element 112. For example, non-contact radiative heating element 112 may be configured to create a relatively hot zone 117 proximate to non-contact radiative heating element 112. Non-contact radiative heating element 112 may be configured to control a temperature of the relatively hot zone 117 to vary at least one of along movement axis 113 or around movement axis 113 (e.g., a circumference of non-contact radiative heating element 112).

In some examples, non-contact radiative heating element 112 may be configured to vary a temperature of a relatively hot zone 117 along movement axis 113 of article 80 through non-contact radiative heating element 112. This variable temperature may permit control over a temperature or heating profile as article moves in and out along axis 113. As one example, sintering may include heating through various temperature ranges that may cause defects in article 80, such as cracking, bubbling, or other defects. To avoid forming these defects, these temperature ranges may be progressed through at a slower rate. Correspondingly, hot zone 117 may have a lower temperature to heat article 80 at the slower rate through these temperature ranges, such as at an entrance zone of non-contact radiative heating element 112. As another example, sintering may include various post-treatment processes, such as annealing. Correspondingly, hot zone 117 may have a lower temperature after a middle of hot zone 117 is passed to produce, for example, a slower anneal step.

For example, controller 118 may be configured to control power source 116 to emit a first amount of radiation at a first axial position along movement axis 113, such as a proximal end, and a second, different amount of radiation at a second axial position along movement axis 113, such as a distal end. The first amount of radiation at the proximal end may be higher, such that the relatively cool pre-sintered ceramic coating 84 may be brought to the sintering temperature more rapidly, while the second amount of radiation at the distal end may be lower, such that the now-heated pre-sintered ceramic coating 84 may be maintained at or above the sintering temperature.

In some examples, non-contact radiative heating element 112 may be configured to vary a temperature of a relatively hot zone 117 around or across movement axis 113 of article 80 through (e.g., tubular) or by (e.g., planar) non-contact radiative heating element 112, such that non-contact radiative heating element 112 may vary temperature in a single plane across axis 113. Due to relatively high sintering temperatures of coating 84, it may be difficult to bring coating 84 to the sintering temperature without at least partially heating underlying substrate 82, as thermal conduction of heat from coating 84 may be faster than application of radiation to coating 84. As such, non-contact radiative heating element 112 may be configured to produce a heating gradient through article 80 by heating different portions of article 80 to different temperatures. For example, to heat coating 84 to a sintering temperature of about 2000° C., a bottom side of article 80 may be heated to about 1300° C., while top side of article 80 that has coating 84 may be heated to about 2000° C.

For example, controller 118 may be configured to control power source 116 to emit a first amount of radiation at a first radial position around movement axis 113, such as a top, and a second, different amount of radiation at a second radial position around movement axis 113, such as a bottom. The first amount of radiation at the top near coating 84 may be higher, such that coating 84 may receive a relatively high amount of radiation, while the second amount of radiation at the bottom near substrate 82 may be lower or absent, such that substrate 82 may receive a relatively low amount of radiation.

System 110 may include actuation system 114 configured to permit relative movement between non-contact radiative heating element 112 and article 80, such as axially through non-contact radiative heating element 112 or radially in non-contact radiative heating element 112. In some examples, actuation system 114 may be configured to position a particular portion of pre-sintered ceramic coating 84 proximate to radiative surfaces 115 of non-contact radiative heating element 112, such as by moving article 80 along movement axis 113 relative to non-contact radiative heating element 112 to sinter another portion of pre-sintered ceramic coating 84. As one example, non-contact radiative heating element 112 may be coupled to actuation system 114 and configured to move with respect to a stationary article 80, such as along movement axis 113 to heat different axial portions of coating 84 or perpendicular to movement axis 113 to increase or decrease a distance of coating 84 from non-contact radiative heating element 112. As another example, non-contact radiative heating element 112 may be fixed and article 80 may be positioned on a conveyer or frame configured to move article 80 through non-contact radiative heating element 112 along movement axis 113. Actuation system 114 may include one or more actuators configured to receive control signals from controller 118 and move non-contact radiative heating element 112 and/or article 80 according to various parameters, such as a speed of relative movement, an axial position on article 80, a distance between non-contact radiative heating element 112 and coating 84, or other parameters based on relative movement between non-contact radiative heating element 112 and/or article 80 that may be based on a time of heat treatment or portion of article 80.

Figure 5C:
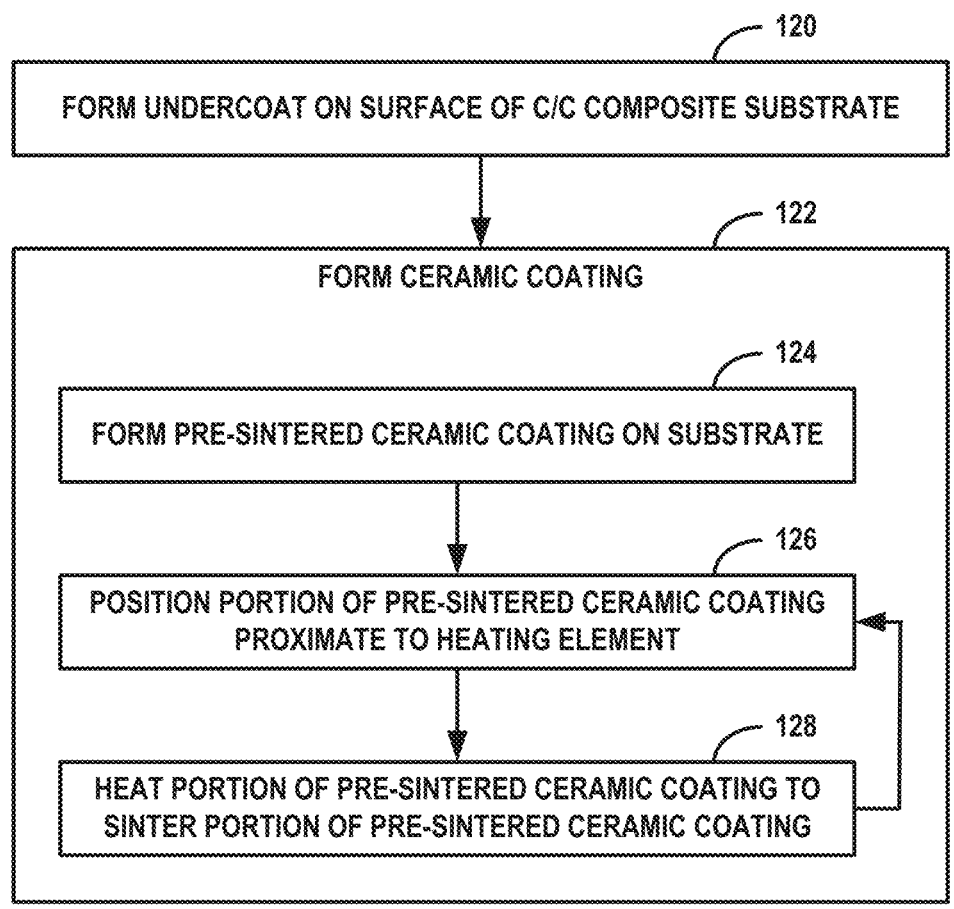
FIG. 5C is a flow diagram illustrating an example technique for forming a high temperature coating using a non-contact radiative heating element in accordance with the techniques of this disclosure.

FIG. 5C is a flow diagram illustrating an example technique for forming a high temperature coating using a non-contact radiative heating element, such as non-contact radiative heating element 112 of FIG. 5C, in accordance with the techniques of this disclosure. FIG. 5C will be described with respect to system 110 of FIGS. 5A and 5B; however, other systems may be used to implement the examples of FIG. 5C, such as systems that implement another type of non-contact radiative heating to locally heat a pre-sintered ceramic coating on a ceramic composite substrate. In some examples, the method of FIG. 5C may include forming an undercoat, such as crystallized metal carbide undercoat 56 of FIG. 2, on a surface of ceramic composite substrate 82 (120), such as described in step 100 of FIG. 4C.

The method of FIG. 5C may include forming a high temperature coating, such as high temperature coating 54 of FIG. 2, on substrate 82 (122). The method of FIG. 5C may include applying pre-sintered ceramic coating 84 to a surface of ceramic composite substrate 82 (124), such as described in step 104 of FIG. 4C. In some examples, the surface of substrate 82 may be contoured or difficult to directly access, such that contact heating methods may not be adequate for or capable of contacting the surfaces of pre-sintered ceramic coating 84.

The method of FIG. 5C may include sintering at least a portion of pre-sintered ceramic coating 84 by heating the portion of pre-sintered ceramic coating 84, using radiation produced by joule heating, to a sintering temperature of pre-sintered ceramic coating 84. For example, in contrast to bulk heating, in which a surrounding gas in a furnace may heat an article using convection, radiative heating may produce relatively concentrated heat. This relatively concentrated heat may be spatially controlled using either/both distance of article 80 from non-contact radiative heating element 112 and/or a power/temperature of non-contact radiative heating element 112, such that the plurality of ceramic particles of pre-sintered ceramic coating 84 that are proximate to radiative surfaces 115 may reach a sintering temperature in a relatively short amount of time, while portions of substrate 82 that are not proximate to radiative surfaces 115 may remain at lower temperatures as coating 84 is sintered or may be exposed to high temperatures for a short amount of time relative to bulk heating. At the same time, surfaces of pre-sintered ceramic coating 84 that are relatively difficult to access or contact may still be sintered without heating a surrounding atmosphere, such as during bulk heating methods. In some examples, the sintering temperature may be greater than about 1000° C. In some examples, an average bulk temperature of substrate 82 may be at least about 100° C. less than an average bulk temperature of coating 84 during sintering.

In some examples, sintering the portion of pre-sintered ceramic coating 84 may include heating pre-sintered ceramic coating 84 using one or more non-contact radiative heating elements 112. The method of FIG. 5C may include positioning a portion of ceramic coating 84 proximate to non-contact radiative heating element 112 (126). For example, controller 118 may send out control signals to actuation system 114 to control relative movement between non-contact radiative heating element 112 and article 80, such that non-contact radiative heating element 112 positions a particular portion of pre-sintered ceramic coating 84 at an axial position along movement axis 113 of non-contact radiative heating element 112. The method of FIG. 5C may include powering non-contact radiative heating element 112 to heat the portion of pre-sintered ceramic coating to or above the sintering temperature (128). For example, controller 118 may send control signals to power source 116 to power non-contact radiative heating element 112 at a particular power level, to a particular temperature of non-contact radiative heating element 112, to a particular temperature of a hot zone 117 created by non-contact radiative heating element 112, and/or for a particular amount of time to achieve the sintering temperature in coating 84 to substantially sinter the plurality of ceramic particles of coating 84.

To sinter pre-sintered ceramic coating 84, the plurality of ceramic particles may be heated to a sintering temperature and maintained at the sintering temperature for a period of time until ceramic material of the ceramic particles migrate across particles to fuse the ceramic particles together. As such, sintering pre-sintered ceramic coating 84 may be controlled through operating conditions such as a temperature of or power delivered to non-contact radiative heating element 112, a distance between pre-sintered ceramic coating 84 and non-contact radiative heating element 112, a temperature of pre-sintered ceramic coating 84 (e.g., measured by a temperature sensor or determined based on other factors), an amount of exposure time of pre-sintered ceramic coating 84 and non-contact radiative heating element 112, and other factors that relate to an amount and rate of heat delivery to pre-sintered ceramic coating 84.

In some examples, the method of FIG. 5C may include sintering another portion of pre-sintered ceramic coating 84. For example, controller 118 may control actuation system 114 to control non-contact radiative heating element 112 to be positioned proximate to a different portion of coating 84 and/or substrate 82 and heat the other portion of coating 84 to a sintering temperature. In some examples, pre-sintered ceramic coating 84 may be sintered as a batch. For example, an entire article 80 may be positioned within non-contact radiative heating element 112 and heated for a particular amount of time. In some examples, pre-sintered ceramic coating 84 may be sintered continuously as article 80 proceeds through non-contact radiative heating element 112 along movement axis 113. For example, a particular radiative surface area defined by non-contact radiative heating element 112 may be continuously moved across a surface of coating 84, such that a particular portion of coating 84 may be heated for a particular amount of time corresponding to a rate of relative movement between non-contact radiative heating element 112 and article 80 as article 80 proceeds from entrance to exit along movement axis 113.

In some examples, the method of FIG. 5C may include varying a temperature of relatively hot zone 117 along movement axis 113 of article 80 through non-contact radiative heating element 112. For example, controller 118 may control power source 116 to emit a first amount of radiation at a first axial position along movement axis 113, such as a proximal end, and a second, different amount of radiation at a second axial position along movement axis 113, such as a distal end. The first amount of radiation at the proximal end may be higher, such that the relatively cool pre-sintered ceramic coating 84 may be brought to the sintering temperature more rapidly, while the second amount of radiation at the distal end may be lower, such that the now-heated pre-sintered ceramic coating 84 may be maintained at or above the sintering temperature.

In some examples, the method of FIG. 5C may include varying a temperature of relatively hot zone 117 around or across movement axis 113 of article 80 through (e.g., tubular) or by (e.g., planar) non-contact radiative heating element 112. For example, controller 118 may control power source 116 to emit a first amount of radiation at a first radial position around movement axis 113, such as a top, and a second, different amount of radiation at a second radial position around movement axis 113, such as a bottom. The first amount of radiation at the top near coating 84 may be higher, such that coating 84 may receive a relatively high amount of radiation, while the second amount of radiation at the bottom near substrate 82 may be lower or absent, such that substrate 82 may receive a relatively low amount of radiation.

Figure 6A:
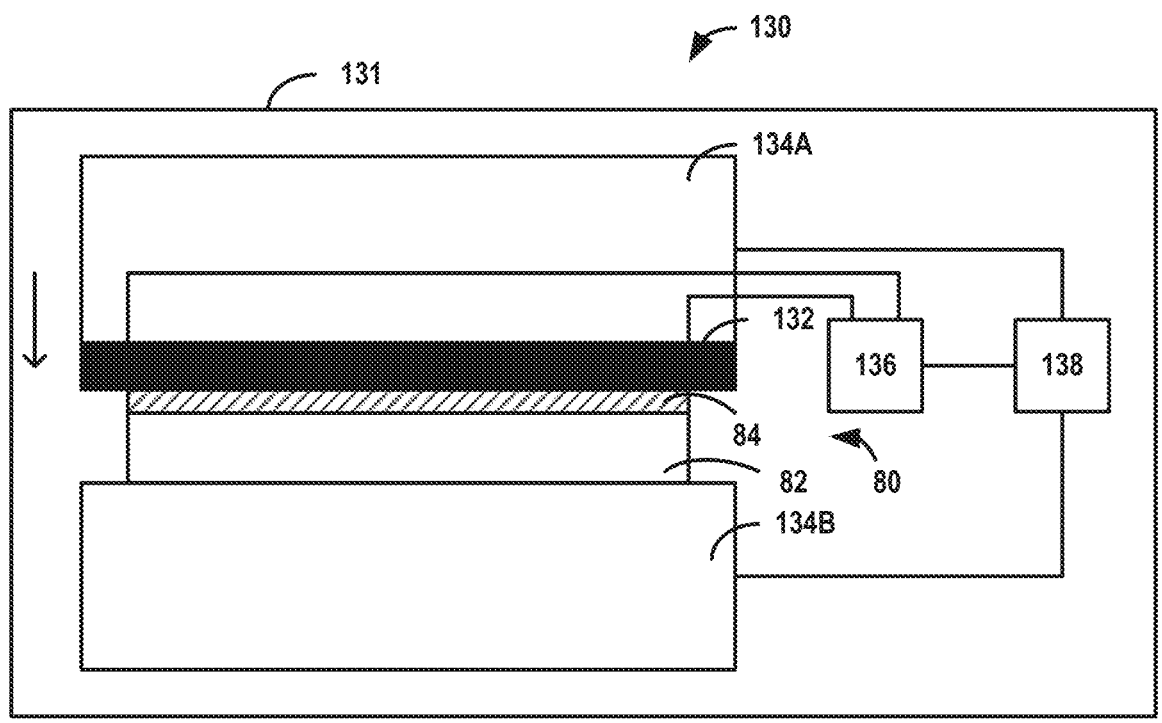
FIG. 6A is a conceptual diagram illustrating an example system for forming a high temperature coating using a contact element and a load in accordance with the techniques of this disclosure.

In some examples, high temperature coatings described herein may be formed from as a pre-sintered ceramic coating and sintered through one or more external contact heating sources that may apply both heat and pressure locally at the coating to quickly and efficiently sinter and densify the pre-sintered ceramic coating, and may thereby avoid or reduce exposure of the underlying substrate to extreme temperature and pressure conditions. For example, rather than sinter the ceramic coatings in a large furnace under extreme operating conditions and subject to large heat losses, local application of heat and pressure may sinter coatings on substrates having a wide range of sizes, shapes, and compositions, including coatings on relatively large or non-conductive substrates. FIG. 6A is a conceptual diagram illustrating an example system 130 for forming a high temperature coating using a contact element and an applied load, in accordance with the techniques of this disclosure. FIG. 6A will be described with respect to article 80 of FIG. 4A above, including substrate 82 and pre-sintered ceramic coating 84. System 130 includes an enclosed chamber 131, an actuation system 134, a power source 136, and a controller 138 which, unless otherwise specified, may be functionally and/or compositionally similar to enclosed chamber 71, actuation system 74, power source 76, and controller 78 of FIG. 4A.

System 130 may be configured to sinter one or more portions of pre-sintered ceramic coating 84. System 130 includes one or more contact heating elements 132. While contact heating element 132 is illustrated as a single contact heating element, any number of contact heating elements may be used. Contact heating element 132 may include any heating element capable of contacting pre-sintered ceramic coating 84 and heating pre-sintered ceramic coating 84 to a sintering temperature of the plurality of ceramic particles. Contact heating element 132 may include a surface configured to contact pre-sintered ceramic coating 84. In the example of FIG. 6A, contact heating element 132 has a substantially planar surface corresponding to a planar surface of coating 84 and substrate 82, such that a force applied to coating 84 may be relatively even across the planar surface of pre-sintered ceramic coating 84.

Contact heating element 132 may be configured to resist relatively high temperatures experienced during sintering of the ceramic particles and relatively high forces experienced from loads. Contact heating element 132 may be a joule heating element configured to heat a portion of the ceramic coating using indirect joule heating. Contact heating element 132 may include one or more conductive high temperature electrodes, such as graphite, tungsten, rhenium, molybdenum, or tantalum electrodes, configured to receive electrical current from power source 136 and generate joule heat from the electrical current, such as through inherent resistivity of the one or more conductive high temperature electrodes, and resist compressive forces during application of a load. For example, graphite electrodes may have high melting point (e.g., about 3500° C.), high removability (e.g., low sticking potential), high thermal conductivity, low electrical resistance, and high resistance to heat and impact. Contact heating element 132 may be configured to transfer at least a portion of this generated heat to the plurality of ceramic particles in the ceramic mixture through conduction to heat the plurality of ceramic particles at or above the sintering temperature. While a portion of the generated heat may further transfer to substrate 82, this portion of the generated heat may be relatively constrained to a surface of substrate 82.

Contact heating element 132 may be configured to heat the plurality of ceramic particles of the ceramic mixture to a sintering temperature of the plurality of ceramic particles. For example, contact heating element 132 may be configured to contact pre-sintered ceramic coating 84 for a particular amount of time that is sufficient to reach and maintain the sintering temperature, such that substantially all the plurality of ceramic particles in coating 84 are sintered. The sintering temperature may be greater than about 1000° C., such as for complex oxides, or greater than about 2000° C., such as for carbides, nitrides, and/or borides.

Contact heating element 132 may be electrically coupled to a power source 136. Power source 136 may be configured to supply electrical power to contact heating element 132 to generate heat from contact heating element 132. Power source 136 may be communicatively coupled to a controller 138. Controller 138 may be configured to control power source 136. For example, controller 138 may be configured to send control signals to power source 136 to control power source 136 to power contact heating element 132, such as to a particular power level or temperature.

Prior to or during sintering, pre-sintered ceramic coating 84 may be subject to one or more physical or chemical processes that may decrease oxidation resistance or structural integrity of the resulting high temperature coating. For example, during sintering, pre-sintered ceramic coating 84 may undergo densification, such as from about 50% to greater than about 99% relative density. This densification results in shrinkage, which may typically be isotropic and in all directions. The in-plane (e.g., x-y direction) shrinkage may be particularly problematic, as cracks and other defects may form, such that perpendicular plane (e.g., z direction) shrinkage may be preferred. Relatively thin coatings may be sintered such that the shrinkage is anisotropic and only in the z direction naturally due to surface and interface interactions, wetting, liquid phases, and/or other mechanisms. However, in other coating systems, especially thicker coatings, shrinkage may not be anisotropic, and in-plane shrinkage may occur. In-plane shrinkage can cause a variety of defects such as mud cracks, micro cracks, voids etc., which may not be ideal for protection of article 80 and the uniformity and quality of coating 84. System 130 may be configured to apply a pressure in the z direction which forces the shrinkage to be substantially anisotropic and in the z direction and reduces and/or prevents the formation of in-plane shrinkage defects. In some ceramic systems, especially ultra-high temperature ceramics (UHTCs) such as carbides and borides, temperature alone may not be sufficient for full densification, such that the applied pressures may enhance the densification, which may not be possible without pressure.

System 130 may include a top actuation system component 134A and a bottom actuation system component 134B (collectively "actuation system 134") or other component or set of components configured to locally apply pressure to pre-sintered ceramic coating 84. In the example of FIG. 6A, contact heating element 132 may be coupled to top actuation system component 134A, while article 80 may be positioned on bottom actuation system component 134B. Top actuation system component 134A and/or bottom actuation system component 134B may be configured to apply pressure to article 80 to compress pre-sintered ceramic coating 84 while sintering pre-sintered ceramic coating 84. Actuation system 134 may be communicatively coupled to controller 138. Actuation system 134 may include one or more load actuators configured to receive control signals from controller 138 and apply pressure to article 80 according to various parameters, such as a force per area, an x/y-axis position on article 80, a desired strain rate, or other parameters.

Controller 138 may be configured to control a load exerted by actuation system 134 to article 80, such that controller 138 may control an amount of pressure exerted on ceramic coating 84. For example, controller 138 may be configured to send control signals to actuation system 134 to control one or more load actuators to apply a load to article 80, such as at a particular force per area, at a particular strain rate, and/or for a particular amount of time. As this load is applied, the plurality of ceramic particles may be compacted as the plurality of ceramic particles are sintered, thereby densifying the ceramic material to form a high temperature, dense ceramic coating. In some examples, the resulting ceramic layer has a porosity of less than about 5 vol. % porosity. With respect to FIGS. 4A-4C, which describe contacting pre-sintered ceramic coating 84, such contact may be relatively low and intended to make thermal or electrical contact with the portion of pre-sintered ceramic coating 84. In contrast, the contact described with respect to FIGS. 6A-6C may be configured to further enhance densification and/or increase z direction shrinkage with corresponding reduction in in-plane shrinkage. In some examples, the load may be up to about 500 MPa.

Figure 6B:
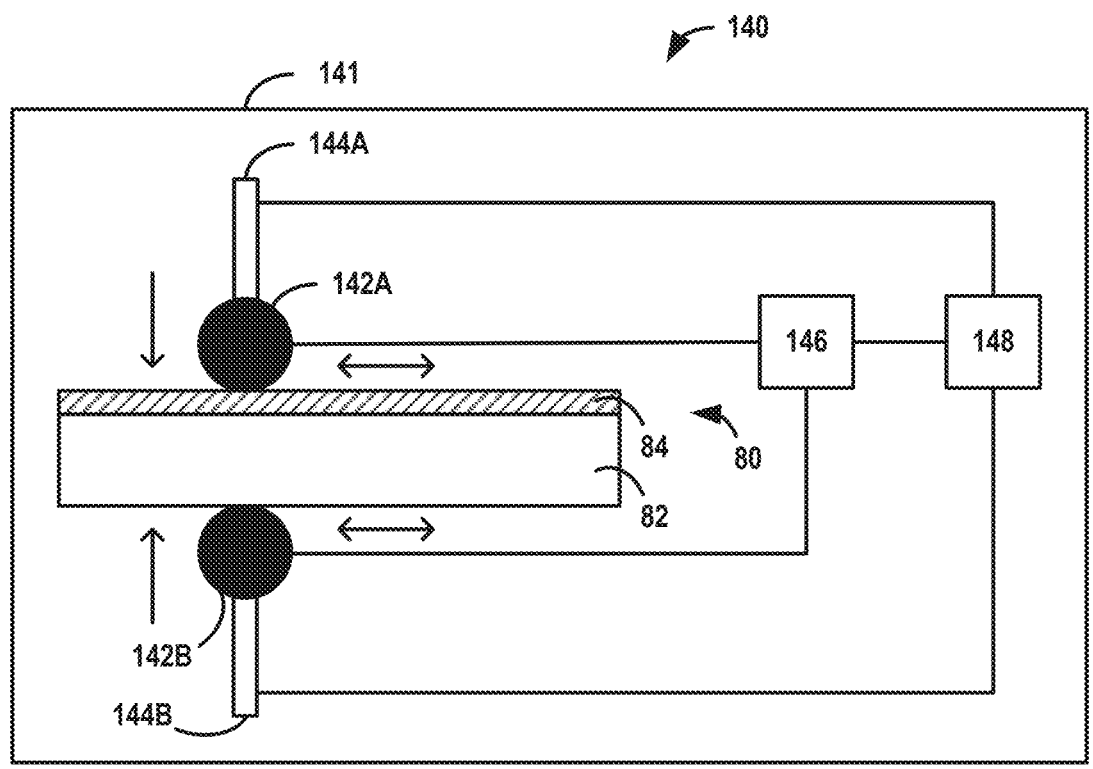
FIG. 6B is a conceptual diagram illustrating an example system for forming a high temperature coating using a contact element and a load in accordance with the techniques of this disclosure.

In some examples, high temperature coatings described herein may be formed as a pre-sintered ceramic coating and sintered through one or more external heating sources that may apply both heat and pressure locally at the pre-sintered ceramic coating to sinter and densify the coatings in a process that may continuously sinter and compress portions of the pre-sintered ceramic coating. FIG. 6B is a conceptual diagram illustrating an example system 140 for forming a high temperature coating using a contact heating element and a load, in accordance with the techniques of this disclosure. System 140 includes an enclosed chamber 141, an actuation system 144, a power source 146, and a controller 148 which, unless otherwise specified, may be functionally and/or compositionally similar to enclosed chamber 131, actuation system 134, power source 136, and controller 138 of FIG. 6A.

System 140 may be configured to continuously sinter one or more portions of pre-sintered ceramic coating 84. System 140 includes a top contact heating element 142A and a bottom contact heating element 142B (collectively "contact heating elements 142"). While contact heating elements 142 are illustrated as two contact heating elements, any number of contact heating elements may be used. For example, bottom contact heating element 142B may be absent, such that only top contact heating element 142A may be configured to heat a top portion of article 80. Contact heating elements 142 may include any heating element capable of contacting pre-sintered ceramic coating 84 and heating pre-sintered ceramic coating 84 to a sintering temperature of the plurality of ceramic particles. Contact heating elements 142 may include curved surfaces configured to contact a first portion of pre-sintered ceramic coating 84 and progress to a second portion of pre-sintered ceramic coating 84 without lifting contact heating element 142. In the example of FIG. 6B, contact heating elements 142 may be rollers configured to advance to sinter another portion of pre-sintered ceramic coating 84, such that a force applied to coating 84 may be applied incrementally along a surface of pre-sintered ceramic coating 84. For example, pre-sintered ceramic coating 84 may have curvature along an axis, such that a planar surface may not adequately compress various portions of coating 84. In contrast, contact heating element 142 having a curved surface may be capable of conforming to curved surfaces.

Contact heating elements 142 may be configured to resist relatively high temperatures experienced during sintering of the ceramic particles and relatively high forces experienced from loads. Contact heating elements 142 may be joule heating elements configured to heat a portion of pre-sintered ceramic coating 84 using indirect joule heating. In some examples, contact heating elements 142 may include one or more graphite electrodes configured to receive electrical current from power source 146 and generate joule heat from the electrical current, such as through inherent resistivity of the one or more graphite electrodes, and resist compressive forces during application of a load.

Contact heating element 142 may be configured to heat the plurality of ceramic particles of the ceramic mixture to a sintering temperature of the plurality of ceramic particles. For example, contact heating element 142 may be configured to contact pre-sintered ceramic coating 84 for a particular amount of time that is sufficient to reach and maintain the sintering temperature, such that substantially all the plurality of ceramic particles in coating 84 are sintered. Contact heating element 142 may be electrically coupled to a power source 136. Power source 146 may be configured to supply electrical power to contact heating element 142 to generate heat from contact heating element 142. Power source 146 may be communicatively coupled to a controller 148. Power source 146 may be configured to receive control signals from controller 148 and deliver power to contact heating elements 142 to generate joule heat in contact heating elements 142, so as at a desired power level and/or desired temperature.

System 130 may include a top actuation system component 144A and a bottom actuation system component 144B (collectively "actuation system 144") or other component or set of components configured to locally apply pressure to pre-sintered ceramic coating 84. In the example of FIG. 6A, contact heating element 142A may be coupled to top actuation system component 144A, contact heating element 142B may be coupled to bottom actuation system component 144B, and article 80 may be between top actuation system component 144A and bottom actuation system component 144B. Top actuation system component 144A and/or bottom actuation system component 144B may be configured to apply pressure to article 80 to compress pre-sintered ceramic coating 84 while sintering pre-sintered ceramic coating 84. Actuation system 144 may be communicatively coupled to controller 148. Actuation system 144 may include one or more load actuators configured to receive control signals from controller 148 and apply pressure to article 80 according to various parameters, such as a force per area, an x/y-axis position on article 80 for planar substrates 82 or an x/y/z-axis position on article 80 for non-planar substrates 82, or other parameters.

In addition to various functions performed by controller 138, controller 148 may be controlled to control actuation system 144 to advance contact heating element 142 to a different portion of pre-sintered ceramic coating 84. For example, controller 148 may be configured to send control signals to actuation system 144 to control a rate of relative movement between contact heating element 142 and article 80 to heat pre-sintered ceramic coating 84 to a particular temperature or at a particular power level (e.g. corresponding to a temperature or heat flux), compress pre-sintered ceramic coating 84 at a particular pressure or load (including dynamic or static pressures or loads), and/or generate relative movement between article 80 and contact heating element 142 to sinter and compress a different portion of pre-sintered ceramic coating 84. In this way, system 140 may be configured to continuously and evenly apply sinter and densify pre-sintered ceramic coating 84 to form a dense, high temperature ceramic coating.

Figure 6C:
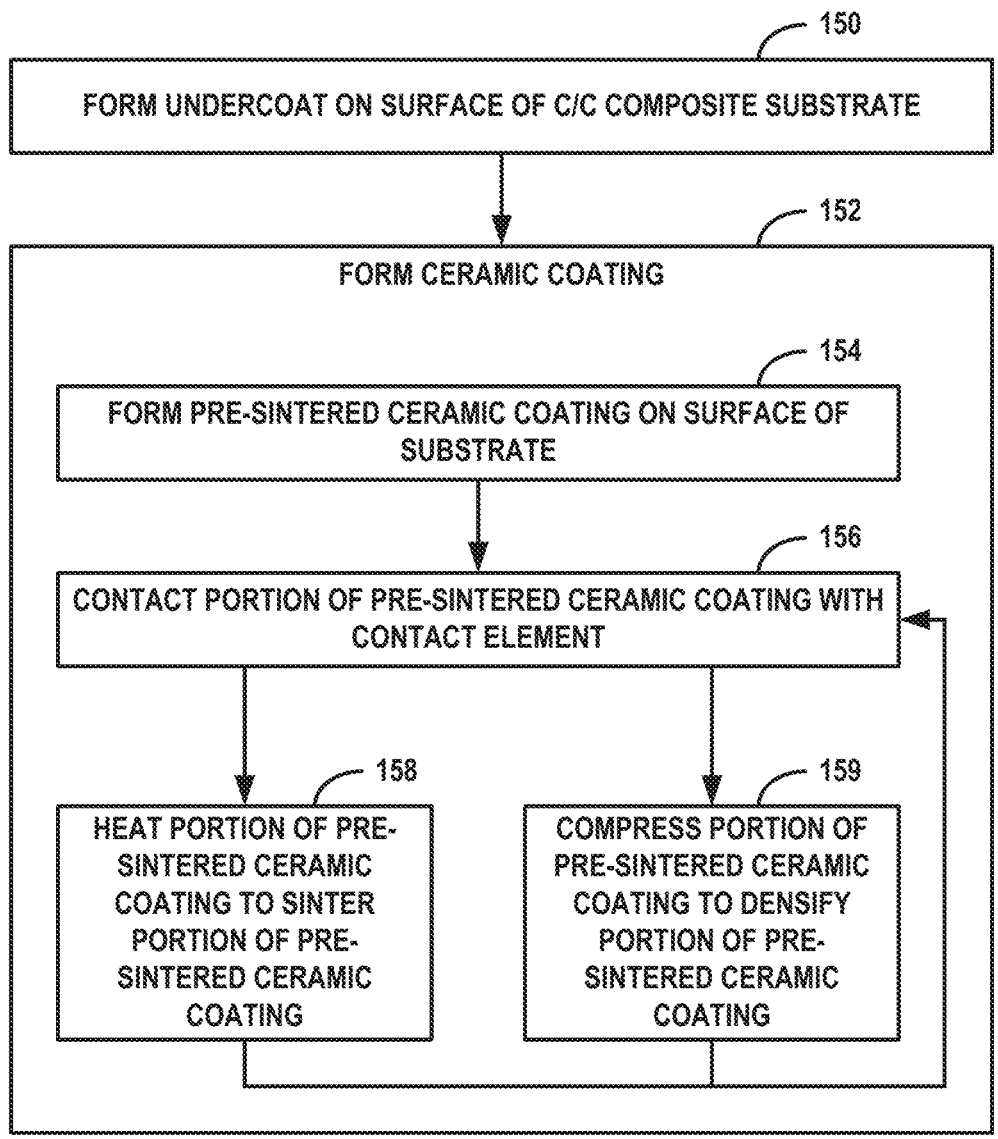
FIG. 6C is a flow diagram illustrating an example technique for forming a high temperature coating using a contact element and a load in accordance with the techniques of this disclosure.

FIG. 6C is a flow diagram illustrating an example technique for forming a high temperature coating using a contact element and a load, such as contact heating element 132 and actuation system 134 of FIG. 6A or contact heating element 142 and actuation system 144 of FIG. 6B, in accordance with the techniques of this disclosure. FIG. 6C will be described with respect to system 130 of FIG. 6A and system 140 of FIG. 6B; however, other systems may be used to implement the examples of FIG. 6C, such as systems that implement another type of heating or load to locally heat and compress a pre-sintered ceramic coating on a ceramic composite substrate. In some examples, the method of FIG. 6C may include forming an undercoat, such as crystallized metal carbide undercoat 56 of FIG. 2, on a surface of ceramic composite substrate 82 (150), such as described in step 100 of FIG. 4C.

The method of FIG. 6C may include forming a high temperature coating, such as high temperature coating 54 of FIG. 2, on substrate 82 (152). The method of FIG. 6C may include forming pre-sintered ceramic coating 84 on a surface of ceramic composite substrate 82 (154), such as described in step 104 of FIG. 4C. The method of FIG. 6C may include contacting a portion of pre-sintered ceramic coating 84 with a contact element, such as contact heating element 132 or contact heating elements 142 (156). For example, controller 138 or controller 148 may send out control signals to actuation system 134 or 144 to control relative movement between contact heating elements 132 or 142 and article 80, such that contact heating elements 132 or 142 may contact a particular portion of pre-sintered ceramic coating 84.

To form a dense, high temperature ceramic coating, the method of FIG. 6C may include sintering at least a portion of pre-sintered ceramic coating 84 by heating the portion of pre-sintered ceramic coating 84, using joule heating, to a sintering temperature of pre-sintered ceramic coating 84 (158) while compressing the portion of pre-sintered ceramic coating 84 (159). In some examples, the sintering temperature may be greater than about 1000° C. In some examples, an average bulk temperature of substrate 82 may be at least about 100° C. less than an average bulk temperature of coating 84 during sintering.

In some examples, sintering the portion of pre-sintered ceramic coating 84 may include heating pre-sintered ceramic coating 84 using one or more external heating sources that may concentrate heat locally at pre-sintered ceramic coating 84 and leave underlying substrate 82 at relatively low temperatures compared to bulk heating methods. Referring also to FIG. 6A, the method of FIG. 6C may include contacting a portion of pre-sintered ceramic coating 84 with a joule heating element, such as contact heating element 132 or contact heating elements 142. For example, controller 138 or 148 may send out control signals to actuation system 134 or 144 to control relative planar movement (e.g., perpendicular to an applied load of actuation system 134 or actuation system 144) between contact heating element 132 or contact heating element 142 and article 80, such that contact heating element 132 or contact heating element 142 contacts a particular portion of pre-sintered ceramic coating 84. The method of FIG. 6C may include powering contact heating element 132 to heat the portion of pre-sintered ceramic coating to or above the sintering temperature (156). For example, controller 78 may send control signals to power source 76 to power contact heating element 72 at a particular power level, to a particular temperature, and/or for a particular amount of time to achieve the sintering temperature in coating 84 to substantially sinter the plurality of ceramic particles of coating 84.

In some examples, compressing the portion of pre-sintered ceramic coating 84 may include applying a load to pre-sintered ceramic coating 84 using actuation systems 134 or 144 while concentrating heat locally at the portion of pre-sintered ceramic coating 84. Referring to FIG. 6A, the method of FIG. 6C may include applying a particular load to pre-sintered ceramic coating 84 using actuation system 134 to compress the portion of pre-sintered ceramic coating 84 for a particular amount of compression time at the sintering temperature. For example, a particular load and/or a particular compression time may correspond to a force that may compress and densify pre-sintered ceramic coating 84 without damaging pre-sintered ceramic coating 84 and/or underlying substrate 82. In some examples, a compression load may be up to about 500 MPa, while a compression time may be between about five seconds to about five minutes.

In some examples, the method of FIG. 6C may include sintering another portion of pre-sintered ceramic coating 84. For example, controllers 138 and/or 148 may control a respective actuation system 134 or 144 to control respective contact heating element 132 or 142 to contact a different portion of coating 84 and/or substrate 82 and heat the other portion of coating 84 to a sintering temperature. In the example of FIG. 6A, pre-sintered ceramic coating 84 may be sintered in discrete portions. For example, a particular surface area defined by contact heating element 132 may be heated and compressed, followed by repositioning of contact heating element 132 relative to article 80 to heat a different portion of coating 84 such that a particular portion of coating 84 may be heated and compressed for a particular contact time between contact heating element 132 and article 80. In the example of FIG. 6B, pre-sintered ceramic coating 84 may be sintered continuously. For example, a particular surface area defined by contact heating element 142 may be continuously moved across a surface of coating 84, such that a particular portion of coating 84 may be heated for a particular amount of time corresponding to a rate of relative movement between contact heating element 142 and article 80.

Figure 7A:
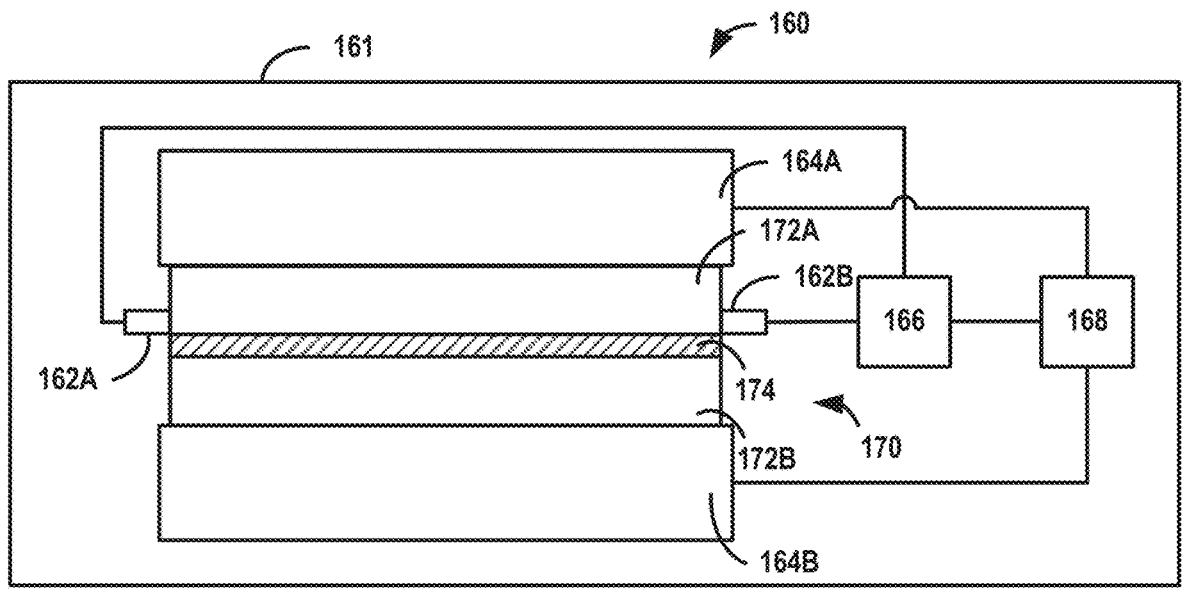
FIG. 7A is a conceptual diagram illustrating an example system for forming a high temperature joint in accordance with the techniques of this disclosure.
Figure 7B:
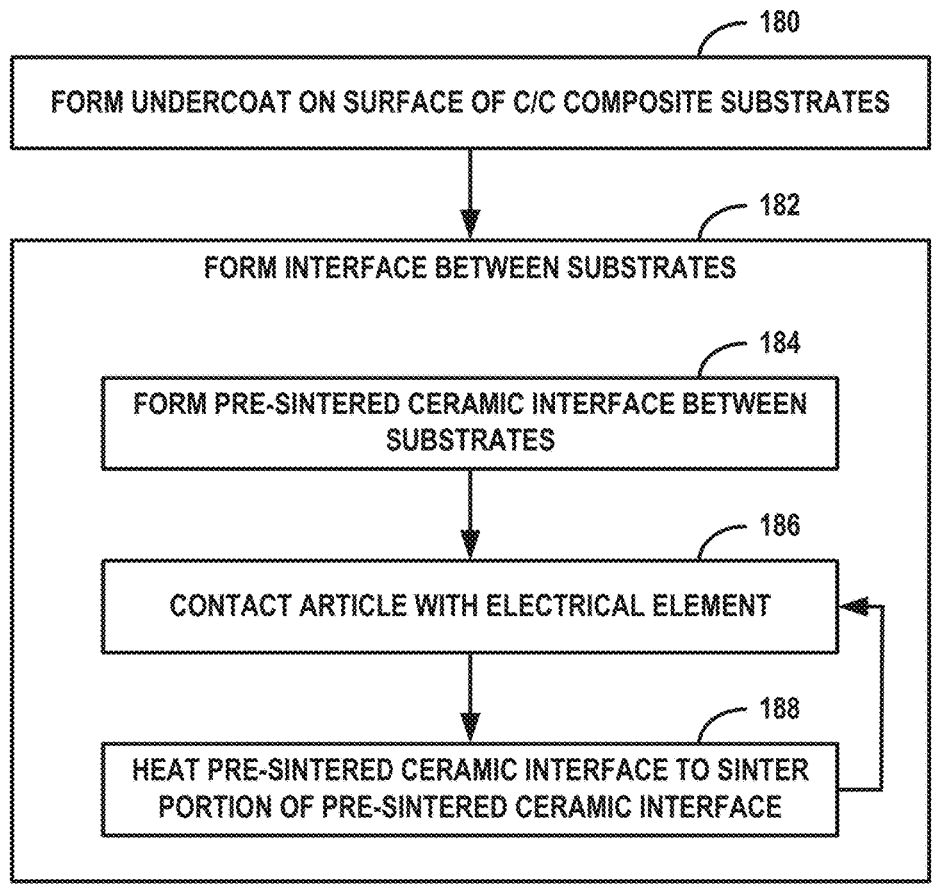
FIG. 7B is a flow diagram illustrating an example technique for forming a high temperature joint in accordance with the techniques of this disclosure.

High temperature interfaces described herein may be formed from a pre-sintered ceramic interface that is sintered using fast, localized joule heating. FIGS. 7A and 7B describe various systems and techniques for forming high temperature interfaces, such as interface layer 68 of FIG. 3. While described individually, these systems and techniques may be used in combination, such as in parallel (e.g., electrical contact of both substrates and interface) or sequentially (e.g., a first stage of one heating mechanism and a second stage of another heating mechanism).

In some examples, high temperature interfaces described herein may be formed as a pre-sintered ceramic interface between two or more adjacent substrates and sintered to join the two or more adjacent substrates in strong bond that reduces exposure of the substrates to high temperatures. FIG. 7A is a conceptual diagram illustrating an example system 160 for forming a high temperature interface in accordance with the techniques of this disclosure. An article 170 includes a first substrate 172A and a second substrate 172B (individually "substrate 172" and collectively "substrates 172") and a pre-sintered ceramic interface 174 between substrates 172. Each substrate 172 may be a ceramic composite substrate, and may be similar to substrate 62 of FIG. 3. Substrate 172 may include an undercoat (not shown), such as undercoat 66 of FIG. 3. System 160 includes an enclosed chamber 161, an actuation system 164, a power source 166, and a controller 168 which, unless otherwise specified, may be functionally and/or compositionally similar to enclosed chamber 131, actuation system 134, power source 136, and controller 138 of FIG. 6A.

In the example of FIG. 7A, pre-sintered ceramic interface 174 may be positioned between surfaces of substrates 172. For example, as will be explained further below, a mixture that includes a plurality of ceramic particles may be applied to a surface of either substrate 172A and/or 172B and dried to form pre-sintered ceramic interface 174. While referred to as "pre-sintered," interface 174 may be partially sintered, such that "pre-sintered" may represent an intermediate state before being substantially sintered.

Pre-sintered ceramic interface 174 may include a plurality of ceramic particles. The plurality of ceramic particles may have a composition that corresponds to a desired composition of a high temperature interface, such as interface layer 68 of FIG. 3. For example, the plurality of ceramic particles may include any of the ceramic materials of interface layer 68 described in FIG. 3, including complex oxide ceramics, a carbide ceramic, a boride ceramic, and/or a nitride ceramic. These ceramic particles may be present as relatively discrete unbonded or partially bonded particles. In addition to a plurality of ceramic particles, pre-sintered ceramic interface 174 may include a plurality of fibers, such as the plurality of fibers described in interface layer 68 of FIG. 3. Interface layer 68 includes fibers distributed throughout the ceramic matrix to provide enhanced mechanical properties to interface 174 and, in some instances, may be electrically and/or thermally conductive to enhance sintering of interface 174. Pre-sintered ceramic interface 174 may have any thickness corresponding to an interface, such as high temperature interface 64 of FIG. 3, sufficient to bond substrates 172 together. In some examples, pre-sintered ceramic interface 174 has a thickness of about 10 micrometers to about five millimeters.

System 160 may be configured to sinter one or more portions of pre-sintered ceramic interface 174 using joule heating generated in pre-sintered ceramic interface 174 and/or one or both substrates 172. System 160 includes one or more contact electrical elements 162A and 162B (individually "contact electrical element 162" and collectively "contact electrical elements 162"). Unless otherwise indicated, contact electrical elements 162 may be functionally and compositionally similar to contact electrical elements 92 of FIG. 4B. Contact electrical elements 162 may include any electrical element capable of contacting pre-sintered ceramic interface 174 and/or substrates 172 to directly (e.g., through joule heat in pre-sintered ceramic interface 174) and/or indirectly (e.g., through joule heat in one or both substrates 172A and 172B) heat the sandwiched pre-sintered ceramic interface 174 to a sintering temperature of the plurality of ceramic particles of interface 174.

Contact electrical element 162 may be configured to deliver an electrical current to pre-sintered ceramic interface 174 and/or one or both substrates 172 to heat the plurality of ceramic particles of pre-sintered ceramic interface 174 to a sintering temperature of the plurality of ceramic particles. The sintering temperature may be greater than about 1000° C., such as for complex oxides, or greater than about 2000° C., such as for carbides, nitrides, and/or borides. In some examples, contact electrical elements 162 may include one or more electrical contacts configured to deliver electrical current to a portion of pre-sintered ceramic interface 174 and/or a portion of substrate 172A and/or 172B.

Contact electrical elements 92 may include one or more electrical contacts configured to receive electrical current from power source 166 and deliver the electrical current to the portion of pre-sintered ceramic interface 174 and/or one or both substrates 174. As one example, pre-sintered ceramic interface 174 may include conductive fibers that may generate resistive heat from the electrical current and transfer at least a portion of the heat to the surrounding ceramic mixture to heat plurality of ceramic particles to the sintering temperature and join substrates 172. As another example, substrate 172 may include ceramic material, such as ceramic fibers and/or a ceramic matrix, that may generate resistive heat from the electrical current and transfer at least a portion of this generated heat to the plurality of ceramic particles in pre-sintered ceramic interface 174 through conduction to heat the plurality of ceramic particles at or above the sintering temperature.

Contact electrical elements 162 may be electrically coupled to a power source 166. Power source 166 may be configured to supply or receive electrical power to and from contact electrical elements 162 for delivery to substrate 172 to generate heat from substrate 172. Power source 166 may be communicatively coupled to controller 168. Power source 166 may be configured to receive control signals from controller 168 and deliver electrical current to contact electrical elements 162 based on the control signals.

Actuation system 164 may be configured to maintain a position of substrates 172, such as by compressing substrates 172. System 160 may include a top actuation system component 164A and a bottom actuation system component 164B (collectively "actuation system 164") or other component or set of components configured to position pre-sintered ceramic interface 174 between substrates 172 and locally apply pressure to pre-sintered ceramic interface 174. Unless otherwise indicated, actuation system 164 may be functionally and compositionally similar to actuation system 134 of FIG. 6A.

System 160 includes controller 168. Controller 168 may be configured to control operation of components of system 160 to sinter one or more portions of pre-sintered ceramic interface 174. Controller 168 may be similar to, for example, controller 168 of FIG. 4A. In some examples, controller 168 may be configured to control power source 166. For example, controller 168 may be configured to send control signals to power source 166 to control power source 166 to deliver current to substrate 172, such as to a particular temperature. In some examples, controller 168 may be configured to control relative movement between contact electrical elements 162 and article 170, such that controller 168 may control a relative position of contact electrical elements 162 to heat different portions of pre-sintered ceramic interface 174. In some examples, controller 168 may be configured to control a load exerted by actuation system 164 to article 170, such that controller 168 may control an amount of pressure exerted on pre-sintered ceramic interface 174. For example, controller 158 may be configured to send control signals to actuation system 164 to control one or more load actuators to apply a load to article 170, such as at a particular force per area, at a particular strain rate, and/or for a particular amount of time.

FIG. 7B is a flow diagram illustrating an example technique for forming a high temperature interface using one or more contact electrical elements, such as contact electrical elements 162 of FIG. 7A, to sinter a pre-sintered ceramic interface using joule heat, in accordance with the techniques of this disclosure. FIG. 7B will be described with respect to system 160 of FIG. 7A; however, other systems may be used to implement the examples of FIG. 7B, such as systems that implement another type of heating to locally heat a pre-sintered ceramic interface between ceramic composite substrates. In some examples, the method of FIG. 7B may include forming an undercoat, such as crystallized metal carbide undercoat 66 of FIG. 3, on surfaces of either or both ceramic composite substrates 172A and/or 172B (180), such as described in step 100 of FIG. 4C.

The method of FIG. 7B may include forming a high temperature interface, such as high temperature interface 64 of FIG. 3, between substrates 172 (or other layer overlying substrates 172, such as an undercoat) (182). The method of FIG. 7B may include forming pre-sintered ceramic interface 174 between surfaces of ceramic composite substrates 172A and 172B (184). In some examples, forming pre-sintered ceramic interface 174 may include first applying a plurality of fibers, such as conductive fibers, to a surface of either or both substrate 172A and 172B, followed by applying a ceramic mixture to a surface of either or both substrates 172A and 172B. The ceramic mixture may include a plurality of ceramic particles and a distribution medium, such that the ceramic mixture may be applied as a paste, slurry, or other fluid mixture. The ceramic mixture may be pre-processed prior to sintering to form pre-sintered ceramic interface 174. For example, the ceramic mixture may be dried to remove the distribution medium and pre-fired at a relatively low temperature to burn off volatiles and form pre-sintered (or partially sintered) ceramic interface 174. The method of FIG. 7B may include positioning a second substrate, such as substrate 172B, on pre-sintered ceramic interface 174 on the surface of substrate 172A.

While the method of FIG. 7B has been described as forming pre-sintered ceramic interface 174 on a first substrate 172A and positioning a second substrate 172A on pre-sintered ceramic substrates, in other examples, second substrate 172B may be positioned over first substrate 172A prior to forming pre-sintered ceramic interface 174. For example, a ceramic mixture may be applied to either or both surfaces of substrate 172A and/or substrate 172B, and substrate 172B may be positioned on substrate 172A, such that the ceramic mixture is positioned between substrates 172. After positioning substrates 172, the ceramic mixture may be pre-processed, such as dried or pre-fired at a low temperature to form pre-sintered ceramic interface 174 between substrates 172. In this way, pre-sintered ceramic interface 174 may more readily adhere to surfaces of substrates 172, while substrates 172 may only be exposed to relatively low temperatures involved in pre-sintering or other pre-processing techniques to form pre-sintered ceramic interface 174.

The method of FIG. 7B may include contacting article 170, such as either a portion of pre-sintered ceramic interface 174 or one or more portions of substrates 172, with contact electrical elements 162 (186). For example, controller 168 may send out control signals to actuation system 164 to control relative movement between contact electrical elements 162 and article 170, such that contact electrical elements 162 may contact a particular portion of pre-sintered ceramic interface 174.

The method of FIG. 7B may include sintering at least a portion of pre-sintered ceramic interface 174 by heating the portion of pre-sintered ceramic interface 174, using joule heating, to a sintering temperature of pre-sintered ceramic interface 174 (188). For example, in contrast to bulk heating, in which a surrounding gas in a furnace may heat an adhesive layer by heating adjacent substrates, joule heating within pre-sintered ceramic interface 174 or within substrates 172 may produce relatively concentrated heat that may be controlled such that the plurality of ceramic particles of pre-sintered ceramic interface 174 may reach a sintering temperature in a relatively short amount of time, while portions of substrates 172 that are not adjacent to pre-sintered ceramic interface 174 may remain at lower temperatures as pre-sintered ceramic interface 174 is sintered. In some examples, pre-sintered ceramic interface 174 may be sintered in less than about one minute. In some examples, the sintering temperature may be greater than about 1000° C. In some examples, an average bulk temperature of substrates 172 may be at least about 100° C. less than an average bulk temperature of pre-sintered ceramic interface 174 during sintering.

In some examples, sintering the portion of pre-sintered ceramic interface 174 may include heating pre-sintered ceramic interface 174 using joule heat generated within pre-sintered ceramic interface 174 and substrates 172 at relatively low temperatures compared to bulk heating methods. Referring also to FIG. 7A, the method of FIG. 7B may include contacting one or both substrates 172 with a contact element, such as contact electrical elements 162. For example, controller 98 may send out control signals to actuation system 164 to control relative movement between contact electrical elements 162 and article 170, such that contact electrical elements 162 contact a particular portion of pre-sintered ceramic interface 174. The method of FIG. 7B may include applying an electrical current to pre-sintered ceramic interface 174 to generate joule heat in pre-sintered ceramic interface 172. For example, the conductive fibers in pre-sintered ceramic interface 174 may heat up in response to the electrical current. This heat may transfer through conduction to heat the ceramic particles in the portion or portions of pre-sintered ceramic interface 174 to or above the sintering temperature. For example, controller 178 may send control signals to power source 176 to deliver electrical current to contact electrical elements 162 to achieve a particular temperature of pre-sintered ceramic interface 174 and/or for a particular amount of time to achieve the sintering temperature in pre-sintered ceramic interface 174 to substantially sinter the plurality of ceramic particles of pre-sintered ceramic interface 174.

In some examples not shown in FIG. 7A, sintering the portion of pre-sintered ceramic interface 174 may include heating pre-sintered ceramic interface 174 using one or more adjacent substrates 172 that may concentrate heat locally at a surface of substrates 172 near pre-sintered ceramic interface 174 and leave other portions of substrates 172 at relatively low temperatures compared to bulk heating methods. Referring also to FIG. 7A, the method of FIG. 7B may include contacting one or both substrates 172 with a contact element, such as contact electrical elements 162. For example, controller 98 may send out control signals to actuation system 164 to control relative movement between contact electrical elements 162 and article 170, such that contact electrical elements 162 contact a particular portion or portions of substrates 172 corresponding to a desired portion of pre-sintered ceramic interface 174. The method of FIG. 7B may include applying a current to substrates 172 to generate joule heat in substrates 172. This heat may transfer through conduction to the portion or portions of pre-sintered ceramic interface 174 to heat the ceramic particles in the portion or portions of pre-sintered ceramic interface 174 to or above the sintering temperature. For example, controller 168 may send control signals to power source 166 to deliver electrical current to contact electrical elements 162 to achieve a particular temperature of substrates 172 and/or for a particular amount of time to achieve the sintering temperature in pre-sintered ceramic interface 174 to substantially sinter the plurality of ceramic particles of coating 84. In some examples, the conductive fibers in pre-sintered ceramic interface 174 may assist in conducting this heat from substrate 172 through pre-sintered ceramic interface 174 to quickly and/or evenly sinter ceramic particles of pre-sintered ceramic interface 174.

In some examples, the method of FIG. 7B may include sintering another portion of pre-sintered ceramic interface 174. For example, controller 168 may control actuation system 164 to control contact electrical elements 162 to contact a different portion of pre-sintered ceramic interface 174 and/or substrates 172 and heat a different portion of pre-sintered ceramic interface 174 to a sintering temperature. In some examples, pre-sintered ceramic interface 174 may be sintered in discrete portions. For example, a particular surface area defined by contact electrical elements 162 may be heated, followed by repositioning of contact electrical elements 162 relative to article 170 to heat a different portion of pre-sintered ceramic interface 174 such that a particular portion of pre-sintered ceramic interface 174 may be heated for a particular amount of time corresponding to an amount of contact time between contact electrical elements 162 and article 170. In some examples, pre-sintered ceramic coating 84 may be sintered continuously. For example, a particular surface area defined by contact electrical elements 162 may be continuously moved across a surface of substrates 172 and/or pre-sintered ceramic interface 174, such that a particular portion of pre-sintered ceramic interface 174 may be heated for a particular amount of time corresponding to a rate of relative movement between contact electrical elements 162 and article 170.

Experimental Methods

FIGS. 8A-8D are micrographs of high temperature ceramic coating samples at various degrees of heat treatment. The coating samples were formed on a silicon carbide/silicon carbide (SiC/SiC) composite substrate. The coating samples were each fabricated using contact heating, such as described in FIGS. 4A-4C, and non-contact heating, such as described in FIGS. 5A-5C, and as will be described further below.

A complex oxide slurry was applied to a surface of a SiC/SiC composite substrate and dried. The complex oxide slurry was exposed to 600° C. in air to burn out organics in the slurry. Samples were placed on a moving platform inside a vacuum chamber and moved under a carbon heating element that was heated to about 2000° C. using an electric current. The samples were exposed to the heating element for between about 5 to about 10 seconds of exposure.

Figure 8A:
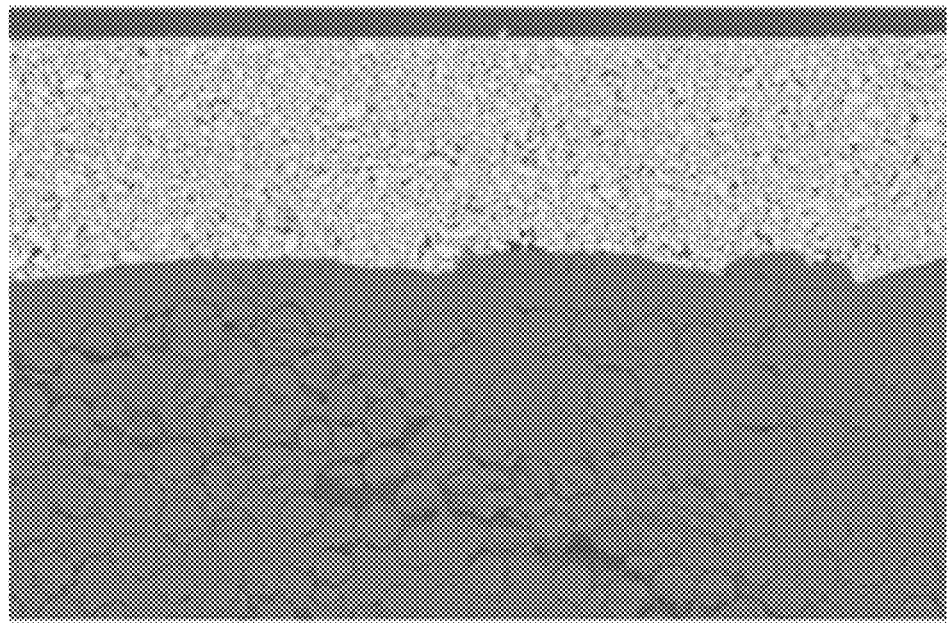
FIG. 8A is a micrograph of a cross-sectional view of a pre-sintered high temperature ceramic coating on a silicon carbide/silicon carbide (SiC/SiC) composite substrate.
Figure 8B:
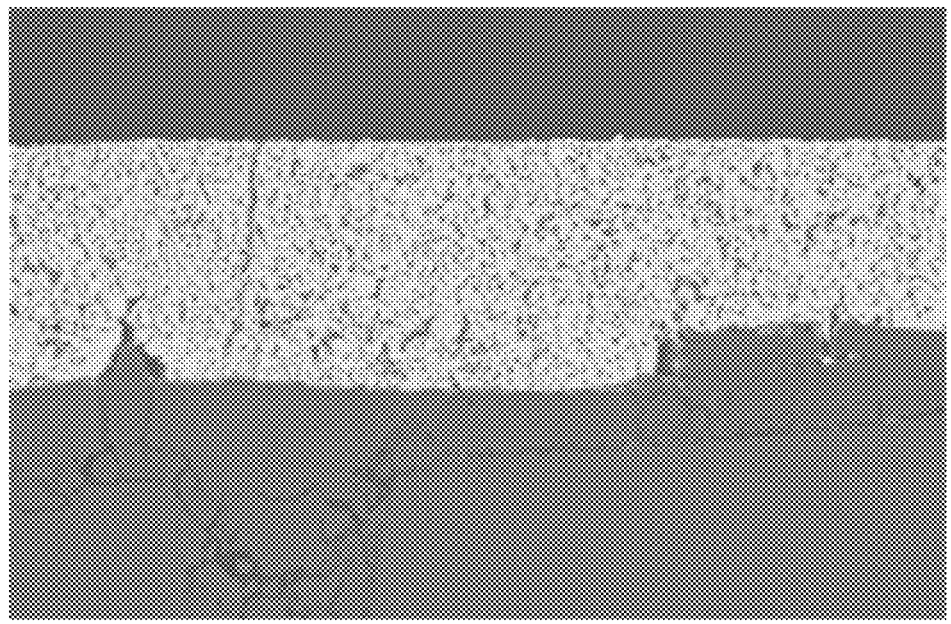
FIG. 8B is a micrograph of cross-sectional view of a partially sintered high temperature ceramic coating on a SiC/SiC composite substrate.
Figure 8C:
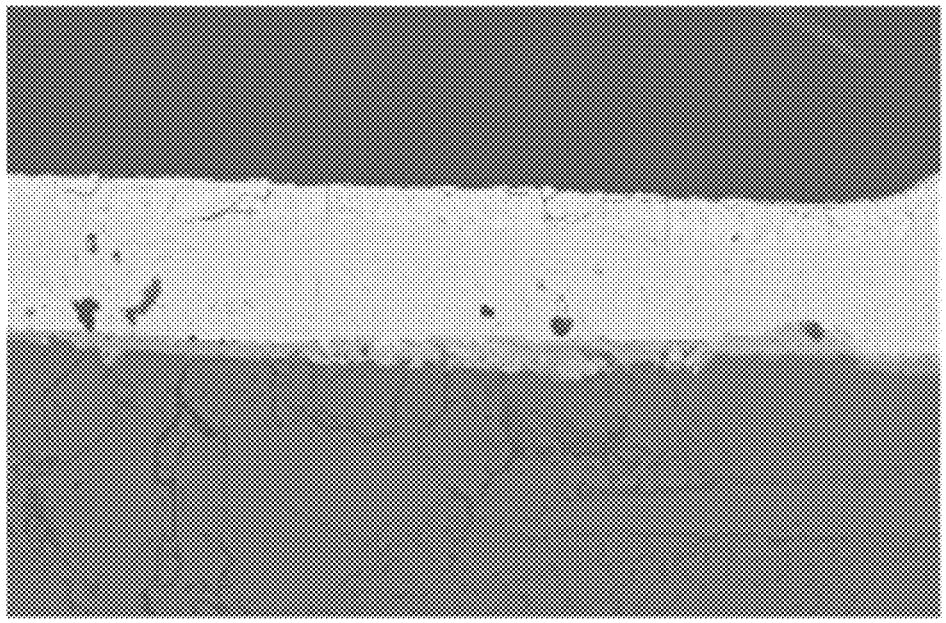
FIG. 8C is a micrograph of a cross-sectional view of a sintered high temperature ceramic coating on a SiC/SiC composite substrate.
Figure 8D:
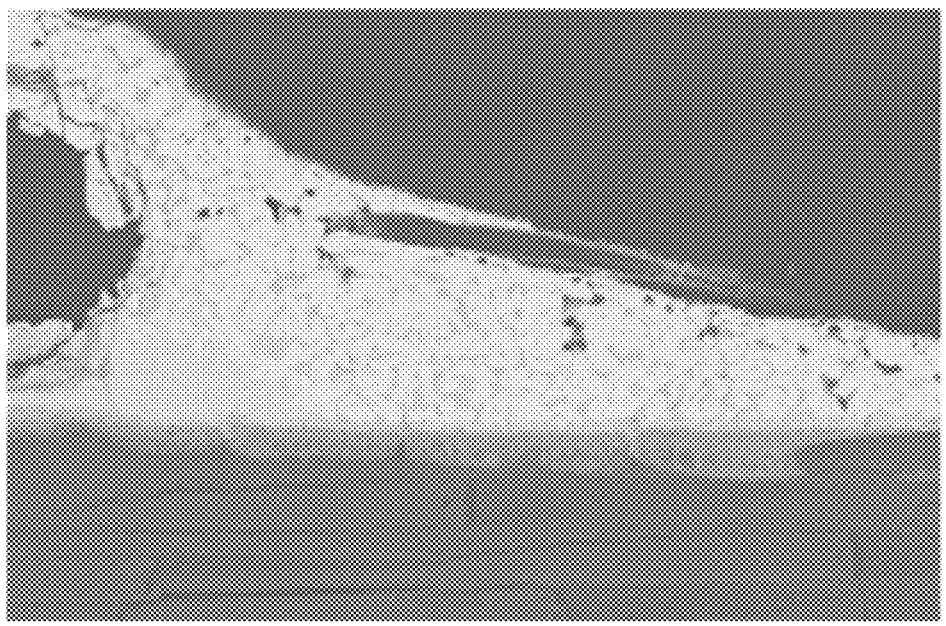
FIG. 8D is a micrograph of a cross-sectional view of a melted high temperature ceramic coating on a SiC/SiC composite substrate.

Depending on a vicinity of the coating of the corresponding sample to the heating element and a temperature gradient of the heating element, different levels of sintering and densification in the short period was demonstrated. FIG. 8A is a micrograph of a cross-sectional view of a pre-sintered high temperature ceramic coating on a SiC/SiC composite substrate; FIG. 8B is a micrograph of cross-sectional view of a partially sintered high temperature ceramic coating on a SiC/SiC composite substrate; FIG. 8C is a micrograph of a cross-sectional view of a sintered high temperature ceramic coating on a SiC/SiC composite substrate; and FIG. 8D is a micrograph of a cross-sectional view of a melted high temperature ceramic coating on a SiC/SiC composite substrate. The coating of FIGS. 8A and 8B may be characterized by a relatively low density and high volume fraction of pores. The coating of FIG. 8D may be characterized by pores, bubbles, and other defects that may result from excess heating that leads to melting of the coating. In contrast, the coating of FIG. 8C may be characterized by a dense, uniform coating.

Although the system was not optimized for temperature uniformity, control, and/or automation, fabrication of the coating samples of FIG. 8A-8D demonstrated sintering of the coatings in a very short period of time (e.g., 5-10 seconds). Undesirable reactions that are present in bulk heating are not present due to their slower kinetics and short firing times, and near melt or melt temperatures of ceramic coatings may be achieved locally on the surface without the substrates experiencing these extreme temperatures. As illustrated in FIGS. 8A-8D, sintering of the coatings may be controlled through temperature, time of heating, and proximity to heating source, such that very dense and uniform coating may be achieved by selecting a corresponding time and temperature. Further, such sintering may be achieved in a non-contact, linear manner using a moving hot zone that can sinter the coating in a sintering front fashion. The coatings demonstrated strong adhesion to the SiC/SiC substrates.

Figure 9:
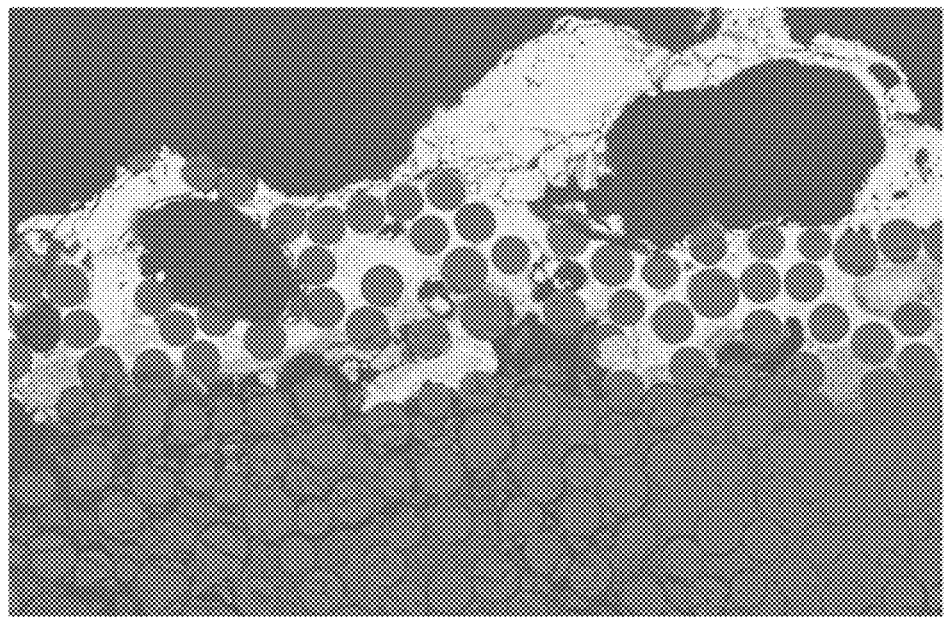
FIG. 9 is a micrograph of a cross-sectional view of a sintered high temperature ceramic interface that includes SiC fibers on a SiC/SiC composite substrate.

FIG. 9 is a micrograph of a cross-sectional view of a sintered high temperature ceramic interface on a SiC/SiC composite substrate. SiC fibers were placed on a surface of the SiC/SiC substrate. A complex oxide slurry was applied to the surface of the SiC/SiC substrate and dried. The SiC fibers and complex oxide slurry were heated using joule heating, such that the complex oxide reached near melt temperatures and incorporated the SiC fibers while adhering to the SiC/SiC substrate. As a result, the ceramic interface included axially-aligned silicon carbide fibers in a carbon matrix. The ceramic interface is contacting a silicon carbide undercoat on the carbon substrate. As such, the fibers were incorporated into the ceramic interface in a short period of few seconds and enhanced the mechanical properties of the ceramic interface.

EXAMPLES

Example 1: A method includes forming a pre-sintered ceramic coating on a ceramic composite substrate, wherein the pre-sintered ceramic coating comprises a plurality of ceramic particles; and sintering at least a portion of the pre-sintered ceramic coating by heating the portion of the pre-sintered ceramic coating to a sintering temperature of the plurality of ceramic particles using joule heating, wherein the sintering temperature is greater than about 1000 degrees Celsius (° C.).

Example 2: The method of example 1, further includes contacting the portion of the pre-sintered ceramic coating with one or more contact heating elements; and powering the one or more contact heating elements to heat the portion of the pre-sintered ceramic coating.

Example 3: The method of example 2, wherein the one or more contact heating elements comprise one or more high temperature electrode heating elements.

Example 4: The method of any of examples 2 and 3, further comprising moving the pre-sintered ceramic coating relative to the one or more contact heating elements to cause the one or more contact heating elements to contact a different portion of the pre-sintered ceramic coating.

Example 5: The method of any of examples 2 through 4, further comprising compressing the portion of the pre-sintered ceramic coating while heating the portion of the pre-sintered ceramic coating.

Example 6: The method of example 5, wherein compressing the portion of the pre-sintered ceramic coating comprises compressing the portion of the pre-sintered ceramic using a roller, wherein the method further comprises advancing the roller to heat another portion of the pre-sintered ceramic coating.

Example 7: The method of any of examples 1 through 6, further includes contacting the portion of the pre-sintered ceramic coating with one or more contact electrical elements; and delivering an electrical current through the one or more contact electrical elements to the substrate to heat the portion of the pre-sintered ceramic coating.

Example 8: The method of any of examples 1 through 7, wherein the plurality of ceramic particles comprises at least one of a carbide ceramic, a boride ceramic, or a nitride ceramic.

Example 9: The method of any of examples 1 through 8, wherein the plurality of ceramic particles comprises a rare earth disilicate ceramic.

Example 10: The method of any of examples 1 through 9, further comprising forming a crystallized metal carbide undercoat on a surface of the ceramic composite substrate.

Example 11: The method of any of examples 1 through 10, wherein forming the pre-sintered ceramic coating further comprises applying a ceramic mixture on a surface of the substrate, wherein the ceramic mixture includes the plurality of ceramic particles.

Example 12: A system for forming a high temperature ceramic coating includes an enclosed chamber configured to: house an article that includes a pre-sintered ceramic coating on a ceramic composite substrate, wherein the pre-sintered ceramic coating comprises a plurality of ceramic particles; and maintain an inert or vacuum atmosphere in the enclosed chamber; and one or more contact elements configured to: contact a portion of the article; and generate joule heat to heat a portion of the pre-sintered ceramic coating to a sintering temperature of the plurality of ceramic particles to sinter the portion of the pre-sintered ceramic coating, wherein the sintering temperature is greater than about 1000° C.

Example 13: The system of example 12, wherein the one or more contact elements comprise one or more contact heating elements configured to generate the joule heat in one or more contact heating elements in response to an electrical current, and wherein the system further comprises a power source configured to deliver electrical current to the joule heating element to heat the portion of the pre-sintered ceramic coating.

Example 14: The system of example 13, wherein the one or more contact heating elements comprises one or more graphite electrode heating elements.

Example 15: The system of any of examples 12 through 14, wherein the one or more contact elements comprise one or more contact electrical elements configured to deliver electrical current to the substrate to generate the joule heat in the substrate in response to the electrical current, and wherein the system further comprises a power source configured to deliver the electrical current to the one or more contact electrical elements to heat the portion of the pre-sintered ceramic coating via the substrate.

Example 16: The system of any of examples 12 through 15, further comprising an actuation system coupled to the one or more contact elements and configured to compress the portion of the pre-sintered ceramic coating while the one or more contact elements heat the portion of the pre-sintered ceramic coating.

Example 17: The system of example 16, wherein the one or more contact elements comprise one or more rollers configured to advance the article to heat another portion of the pre-sintered ceramic coating.

Example 18: The system of any of examples 12 through 17, further comprising an actuation system configured to generate relative movement between the article and the one or more contact elements to cause the one or more contact elements to contact a different portion of the article.

Example 19: The system of any of examples 12 through 18, wherein the plurality of ceramic particles comprises at least one of a carbide ceramic, a boride ceramic, or a nitride ceramic.

Example 20: The system of any of examples 12 through 19, wherein the plurality of ceramic particles comprises a rare earth disilicate ceramic.

Example 21: A method includes forming a pre-sintered ceramic coating on a ceramic composite substrate, wherein the pre-sintered ceramic coating comprises a plurality of ceramic particles; and sintering at least a portion of the pre-sintered ceramic coating by heating the portion of the pre-sintered ceramic coating to a sintering temperature of the pre-sintered ceramic coating using one or more non-contact radiative heating elements, wherein the sintering temperature is greater than about 1000 degrees Celsius (° C.).

Example 22: The method of example 21, further includes positioning the portion of the pre-sintered ceramic coating proximate to the one or more non-contact radiative heating elements; and heating the one or more non-contact radiative heating elements to sinter the portion of the pre-sintered ceramic coating.

Example 23: The method of any of examples 21 and 22, further comprises moving the pre-sintered ceramic coating relative to the one or more non-contact radiative heating elements to cause the one or more non-contact radiative heating elements to sinter a different portion of the pre-sintered ceramic coating.

Example 24: The method of any of examples 21 through 23, further comprising moving the substrate along a movement axis relative to the one or more non-contact radiative heating elements to sinter another portion of the pre-sintered ceramic coating.

Example 25: The method of example 24, wherein the one or more non-contact radiative heating elements are configured to create a relatively hot zone proximate to the one or more non-contact radiative heating elements, and wherein a temperature of the relatively hot zone varies along the movement axis or around the movement axis.

Example 26: The method of any of examples 24 and 25, wherein the one or more non-contact radiative heating elements are configured to create a relatively hot zone proximate to the one or more non-contact radiative heating elements, and wherein a temperature of the relatively hot zone varies around the movement axis.

Example 27: The method of any of examples 21 through 26, wherein the one or more non-contact radiative heating elements comprise an infrared heating element.

Example 28: The method of any of examples 21 through 27, wherein the plurality of ceramic particles comprises at least one of a carbide ceramic, a boride ceramic, a nitride ceramic, or a rare earth disilicate ceramic.

Example 29: The method of any of examples 21 through 28, further comprising forming a crystallized metal carbide undercoat on a surface of the ceramic composite substrate.

Example 30: The method of any of examples 21 through 29, wherein forming the pre-sintered ceramic coating further comprises applying a ceramic mixture on a surface of the substrate, wherein the ceramic mixture includes the plurality of ceramic particles.

Example 31: A system for forming a high temperature ceramic coating includes an enclosed chamber configured to: house an article that includes a pre-sintered ceramic coating on a ceramic composite substrate; and maintain an inert or vacuum atmosphere in the chamber; and one or more non-contact radiative heating elements configured to generate joule heat to heat a portion of the pre-sintered ceramic coating to a sintering temperature of the pre-sintered ceramic coating, wherein the sintering temperature is greater than about 1000 degrees Celsius (° C.).

Example 32: The system of example 31, wherein the one or more non-contact radiative heating elements comprise a joule heating element configured to generate the joule heat in the joule heating element in response to an electrical current, and wherein the system further comprises a power source configured to deliver electrical current to the joule heating element to heat the portion of the pre-sintered ceramic coating.

Example 33: The system of any of examples 31 and 32, further comprising an actuation system configured to position the portion of the pre-sintered ceramic coating proximate to the one or more non-contact radiative heating elements.

Example 34: The system of example 33, wherein the actuation system is configured to move the pre-sintered ceramic coating relative to the one or more non-contact radiative heating elements to cause the one or more non-contact radiative heating elements to sinter a different portion of the pre-sintered ceramic coating.

Example 35: The system of any of examples 33 and 34, wherein the actuation system is configured to move the substrate along a movement axis relative to the one or more non-contact radiative heating elements to sinter another portion of the pre-sintered ceramic coating.

Example 36: The system of example 35, wherein the one or more non-contact radiative heating elements are configured to create a relatively hot zone proximate to the one or more non-contact radiative heating elements, and wherein a temperature of the relatively hot zone varies at least one of along the movement axis or around the movement axis.

Example 37: The system of any of examples 35 and 36, wherein the one or more radiative heating elements comprise one or more one or more radiative surfaces oriented radially inward toward the movement axis and configured to emit radiation at one or more surfaces of the pre-sintered ceramic coating.

Example 38: The system of any of examples 31 through 37, wherein the one or more non-contact radiative heating elements comprise one or more infrared heating elements.

Example 39: The system of any of examples 31 through 38, wherein the pre-sintered ceramic coating comprises at least one of a carbide ceramic, a boride ceramic, or a nitride ceramic.

Example 40: The system of any of examples 31 through 39, wherein the pre-sintered ceramic coating comprises a rare earth disilicate ceramic.

Example 41: A method includes forming an article that includes a first ceramic composite substrate, a second ceramic composite substrate, and a pre-sintered ceramic interface between the first and second ceramic composite substrates, wherein the pre-sintered ceramic interface comprises a plurality of ceramic particles and a plurality of fibers; and sintering at least a portion of the pre-sintered ceramic interface by heating the portion of the pre-sintered ceramic interface to a sintering temperature of the ceramic interface using joule heating to join the first and second substrates, wherein the sintering temperature is greater than about 1000 degrees Celsius (° C.).

Example 42: The method of example 41, wherein heating the portion of the pre-sintered ceramic interface further comprises: contacting the article with one or more contact electrical elements; and delivering an electrical current to the article to heat the portion of the pre-sintered ceramic interface.

Example 43: The method of example 42, wherein contacting the article comprises contacting at least one of the first substrate or the second substrate with the one or more contact electrical elements, and wherein delivering the electrical current to the article comprises delivering the electrical current to the at least one of the first substrate or the second substrate to generate joule heat in the at least one of the first substrate or second substrate.

Example 44: The method of any of examples 42 and 43, wherein contacting the article comprises contacting the pre-sintered ceramic interface with the one or more contact electrical elements; and wherein delivering the electrical current to the article comprises delivering the electrical current to the pre-sintered ceramic interface to generate joule heating in the plurality of fibers of the pre-sintered ceramic interface.

Example 45: The method of any of examples 41 through 44, further comprising compressing the portion of the pre-sintered ceramic interface while heating the portion of the pre-sintered ceramic interface.

Example 46: The method of any of examples 42 through 45, further comprising moving the article and the one or more contact electrical elements to cause the one or more contact electrical elements to contact a different portion of the article.

Example 47: The method of any of examples 41 through 46, further includes forming the pre-sintered ceramic interface on a surface of the first ceramic composite substrate; and positioning the second ceramic composite substrate on the pre-sintered ceramic interface opposite the surface of the first ceramic composite substrate.

Example 48: The method of example 47, wherein forming the pre-sintered ceramic interface comprises applying a ceramic mixture to the surface of the first ceramic composite substrate, and wherein the ceramic mixture includes the plurality of ceramic particles and the plurality of fibers.

Example 49: The method of any of examples 41 through 48, wherein the plurality of ceramic particles comprises a rare earth disilicate ceramic.

Example 50: The method of any of examples 41 through 49, further comprising forming a crystallized metal carbide undercoat on a surface of at least one of the first substrate or the second substrate.

Example 51: The method of any of examples 41 through 50, wherein the plurality of fibers are electrically conductive.

Example 52: An article includes a first ceramic composite substrate; a second ceramic composite substrate; and a high temperature interface between a first surface of the first ceramic composite substrate and a second surface of the second ceramic composite substrate, wherein the high temperature interface comprises at least one high temperature interface layer that includes a ceramic matrix and a plurality of fibers distributed through the ceramic matrix.

Example 53: The article of example 52, wherein the high temperature interface further comprises: a first crystallized metal carbide undercoat on the first surface of the first ceramic composite substrate; and a second crystallized metal carbide undercoat on the second surface of the second ceramic composite substrate, wherein the high temperature interface layer is positioned between the first metal carbide undercoat and the second metal carbide undercoat.

Example 54: The article of example 53, wherein the ceramic matrix comprises a rare earth disilicate ceramic.

Example 55: The article of any of examples 52 through 54, wherein the article is a component of a brake assembly.

Example 56: The article of any of examples 52 through 55, wherein the plurality of fibers are electrically conductive.

Example 57: A system for forming a high temperature ceramic interface includes an enclosed chamber configured to: house an article that includes a first ceramic composite substrate, a second ceramic composite substrate, and a pre-sintered ceramic interface between the first and second ceramic substrates, wherein the pre-sintered ceramic interface comprises a plurality of ceramic particles and a plurality of fibers; and maintain an inert or vacuum atmosphere in the enclosed chamber; and one or more contact electrical elements configured to: contact a portion of the article; and deliver electrical current to the article to heat a portion of the pre-sintered ceramic interface to a sintering temperature of the plurality of ceramic particles to sinter the portion of the pre-sintered ceramic interface, wherein the sintering temperature is greater than about 1000 degrees Celsius (° C.).

Example 58: The system of example 57, wherein the one or more contact electrical elements are configured to contact at least one of the first substrate or the second substrate and deliver the electrical current to the at least one of the first substrate or the second substrate to generate joule heat in the at least one of the first substrate or the second substrate in response to the electrical current, and wherein the system further comprises a power source configured to deliver the electrical current to the one or more contact electrical elements to heat the portion of the pre-sintered ceramic interface via the at least one of the first substrate or second substrate.

Example 59: The system of any of examples 57 and 58, further comprising an actuation system configured to generate relative movement between the article and the one or more contact electrical elements to cause the one or more contact electrical elements to contact a different portion of the article.

Example 60: The system of any of examples 57 through 59, wherein the plurality of ceramic particles comprises a rare earth disilicate ceramic.

Various examples have been described. These and other examples are within the scope of the following claims.

What is claimed is:

1. A method, comprising:
    forming a pre-sintered ceramic coating on a ceramic composite substrate, wherein the pre-sintered ceramic coating comprises a plurality of ceramic particles;
    contacting at least a portion of the pre-sintered ceramic coating with one or more contact electrical elements;
    delivering an electrical current through the one or more contact electrical elements to the ceramic composite substrate; and
    sintering at least the portion of the pre-sintered ceramic coating by heating the portion of the pre-sintered ceramic coating to a sintering temperature of the plurality of ceramic particles using joule heating induced in the ceramic composite substrate by the delivery of the electrical current through the one or more contact electrical elements to the ceramic composite substrate, wherein the sintering temperature is greater than about 1000 degrees Celsius (° C.).

2. The method of claim 1, further comprising:
    contacting the portion of the pre-sintered ceramic coating with one or more contact heating elements; and
    powering the one or more contact heating elements to heat the portion of the pre-sintered ceramic coating.

3. The method of claim 2, wherein the one or more contact heating elements comprise one or more high temperature electrode heating elements.

4. The method of claim 2, further comprising moving the pre-sintered ceramic coating relative to the one or more contact heating elements to cause the one or more contact heating elements to contact a different portion of the pre-sintered ceramic coating.

5. The method of claim 2, further comprising compressing the portion of the pre-sintered ceramic coating while heating the portion of the pre-sintered ceramic coating.

6. The method of claim 5, wherein compressing the portion of the pre-sintered ceramic coating comprises compressing the portion of the pre-sintered ceramic using a roller, wherein the method further comprises advancing the roller to heat another portion of the pre-sintered ceramic coating.

7. The method of claim 1, wherein the plurality of ceramic particles comprises at least one of a carbide ceramic, a boride ceramic, or a nitride ceramic.

8. The method of claim 1, wherein the plurality of ceramic particles comprises a rare earth disilicate ceramic.

9. The method of claim 1, further comprising forming a crystallized metal carbide undercoat on a surface of the ceramic composite substrate.

10. The method of claim 1, wherein forming the pre-sintered ceramic coating further comprises applying a ceramic mixture on a surface of the ceramic composite substrate, wherein the ceramic mixture includes the plurality of ceramic particles.

* * * * *